US012341814B2

(12) United States Patent
Vissamsetty et al.

(10) Patent No.: US 12,341,814 B2
(45) **Date of Patent: *Jun. 24, 2025**

(54) IMPLEMENTING DECOYS IN A NETWORK ENVIRONMENT

(71) Applicant: SENTINELONE, INC., Mountain View, CA (US)

(72) Inventors: Venu Vissamsetty, San Jose, CA (US); Nitin Jyoti, Bengaluru (IN); Pavan Patel, Bengaluru (IN); Prashanth Srinivas Mysore, Bengaluru (IN)

(73) Assignee: SENTINELONE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,006

(22) Filed: Jan. 24, 2024

(65) Prior Publication Data

US 2024/0380784 A1 Nov. 14, 2024

Related U.S. Application Data

(63) Continuation of application No. 17/822,037, filed on Aug. 24, 2022, now Pat. No. 11,888,897, which is a (Continued)

(51) Int. Cl.
*H04L 9/40* (2022.01)

(52) U.S. Cl.
CPC ........ *H04L 63/1491* (2013.01); *H04L 63/083* (2013.01); *H04L 63/10* (2013.01); *H04L 63/20* (2013.01); *H04L 2463/144* (2013.01)

(58) Field of Classification Search
CPC . H04L 63/1441; H04L 63/1491; H04L 63/20; H04L 2463/144
See application file for complete search history.

(56) References Cited

U.S. PATENT DOCUMENTS

| | | |
|---|---|---|
| 4,979,118 A | 12/1990 | Kheradpir |
| 5,311,593 A | 5/1994 | Carmi |

(Continued)

FOREIGN PATENT DOCUMENTS

| | | |
|---|---|---|
| CN | 103607399 A | 2/2014 |
| EP | 3 171 568 | 5/2017 |

(Continued)

OTHER PUBLICATIONS

Barbhuiya et al., "Detection of neighbor solicitation and advertisement spoofing in IPV6 neighbor discovery protocol." Proceedings of the 4th international conference on Security of information and networks. (2011).

(Continued)

*Primary Examiner* — Zachary A. Davis
(74) *Attorney, Agent, or Firm* — Perkins Coie LLP

(57) ABSTRACT

A system includes one or more "BotMagnet" modules that are exposed to infection by malicious code. The BotMagnets may include one or more virtual machines hosting operating systems in which malicious code may be installed and executed without exposing sensitive data or other parts of a network. In particular, outbound traffic may be transmitted to a Sinkhole module that implements a service requested by the outbound traffic and transmits responses to the malicious code executing within the BotMagnet. Credentials for services implemented by a BotSink may be planted in an active directory (AD) server. The BotSink periodically uses the credentials thereby creating log entries indicating use thereof. When an attacker accesses the services using the credentials, the BotSink engages and monitors an attacker system and may generate an alert. Decoy services may be assigned to a domain and associated with names according to a naming convention of the domain.

19 Claims, 15 Drawing Sheets

Related U.S. Application Data continuation of application No. 15/893,176, filed on Feb. 9, 2018, now Pat. No. 11,470,115.

(56) References Cited

U.S. PATENT DOCUMENTS 6,154,844 A 11/2000 Touboul et al.
6,157,953 A 12/2000 Chang et al.
6,728,716 B1 4/2004 Bhattacharya et al.
6,804,780 B1 10/2004 Touboul
6,836,888 B1 12/2004 Basu et al.
7,076,696 B1 7/2006 Stringer
7,093,239 B1 8/2006 Van der Made
7,181,769 B1 2/2007 Keanini et al.
7,225,468 B2 5/2007 Waisman et al.
7,299,294 B1 11/2007 Bruck et al.
7,305,546 B1 12/2007 Miller
7,322,044 B2 1/2008 Hrastar
7,464,407 B2 12/2008 Nakae et al.
7,530,106 B1 5/2009 Zaitsev et al.
7,543,269 B2 6/2009 Krueger
7,546,587 B2 6/2009 Marr et al.
7,574,740 B1 8/2009 Kennis
7,596,807 B2 9/2009 Ptacek et al.
7,596,808 B1 9/2009 Wilkinson et al.
7,710,933 B1 5/2010 Sundaralingam et al.
7,739,516 B2 6/2010 Bender et al.
7,832,012 B2 11/2010 Huddleston
7,882,538 B1 2/2011 Palmer
7,890,612 B2 2/2011 Todd et al.
7,937,755 B1 5/2011 Guruswamy
7,958,549 B2 6/2011 Nakae et al.
7,984,129 B2 7/2011 Vaught
8,015,605 B2 9/2011 Yegneswaran
8,024,795 B2 9/2011 Newton
8,042,186 B1 10/2011 Polyakov et al.
8,065,722 B2 11/2011 Barford et al.
8,078,556 B2 12/2011 Adi et al.
8,082,471 B2 12/2011 Khan
8,131,281 B1 3/2012 Hildner et al.
8,141,154 B2 3/2012 Gruzman et al.
8,156,556 B2 4/2012 Krishnamurthy
8,171,545 B1 5/2012 Cooley et al.
8,181,033 B1 5/2012 Paul et al.
8,181,250 B2 * 5/2012 Rafalovich ......... H04L 43/0876 726/13
8,204,984 B1 6/2012 Aziz
8,205,035 B2 6/2012 Reddy et al.
8,230,505 B1 7/2012 Ahrens et al.
8,296,842 B2 10/2012 Singh et al.
8,327,442 B2 12/2012 Herz et al.
8,353,033 B1 1/2013 Chen et al.
8,370,931 B1 2/2013 Chien et al.
8,375,444 B2 2/2013 Aziz et al.
8,375,447 B2 2/2013 Amoroso et al.
8,413,238 B1 4/2013 Sutton
8,413,241 B2 4/2013 Weeks et al.
8,418,250 B2 4/2013 Morris et al.
8,438,386 B2 5/2013 Hegli et al.
8,438,626 B2 5/2013 Anderson et al.
8,443,442 B2 5/2013 Wang et al.
8,474,044 B2 6/2013 Zawadowskiy et al.
8,488,466 B2 7/2013 Breslin et al.
8,528,057 B1 9/2013 Garrett
8,528,087 B2 9/2013 Hsu et al.
8,538,578 B2 9/2013 Battles et al.
8,539,582 B1 9/2013 Aziz et al.
8,549,643 B1 10/2013 Shou
8,555,385 B1 10/2013 Bhatkar et al.
8,561,177 B1 10/2013 Aziz et al.
8,566,946 B1 10/2013 Aziz et al.
8,607,054 B2 12/2013 Ramarathinam et al.
8,607,340 B2 12/2013 Wright
8,627,475 B2 1/2014 Loveland et al.
8,677,494 B2 3/2014 Edery et al.
8,713,306 B1 4/2014 Bennett
8,719,937 B2 5/2014 Sundaram et al.
8,725,898 B1 5/2014 Vincent
8,726,389 B2 5/2014 Morris et al.
8,732,296 B1 5/2014 Thomas et al.
8,752,173 B2 6/2014 Yadav
8,789,135 B1 7/2014 Pani
8,793,151 B2 7/2014 Delzoppo et al.
8,821,242 B2 9/2014 Hinman et al.
8,839,369 B1 9/2014 Dai et al.
8,849,880 B2 9/2014 Thelen
8,850,582 B2 9/2014 Endoh et al.
8,880,435 B1 11/2014 Catlett et al.
8,881,282 B1 11/2014 Aziz et al.
8,893,278 B1 11/2014 Chechik
8,898,788 B1 11/2014 Aziz et al.
8,904,527 B2 12/2014 Dawson et al.
8,943,594 B1 1/2015 Arrowood
8,949,986 B2 2/2015 Ben-Shalom
8,959,338 B2 2/2015 Snow et al.
8,973,142 B2 * 3/2015 Shulman ............. H04L 63/0263 455/410
8,984,637 B2 3/2015 Karecha et al.
9,009,829 B2 4/2015 Stolfo et al.
9,027,135 B1 5/2015 Aziz
9,043,920 B2 5/2015 Gula et al.
9,117,078 B1 8/2015 Chien et al.
9,141,792 B2 9/2015 Baluda et al.
9,166,993 B1 10/2015 Liu
9,185,136 B2 11/2015 Dulkin et al.
9,197,601 B2 11/2015 Pasdar
9,213,838 B2 12/2015 Lu
9,225,734 B1 12/2015 Hastings
9,240,976 B1 1/2016 Murchison
9,246,774 B2 1/2016 Mataitis et al.
9,270,690 B2 2/2016 Kraitsman et al.
9,305,165 B2 4/2016 Snow et al.
9,329,973 B2 5/2016 Bhuyan
9,330,259 B2 5/2016 Klein et al.
9,356,942 B1 5/2016 Joffe
9,356,950 B2 5/2016 Vissamsetty et al.
9,369,476 B2 6/2016 Chekina et al.
9,386,034 B2 7/2016 Cochenour
9,398,001 B1 7/2016 Tidd
9,407,602 B2 7/2016 Feghali et al.
9,413,721 B2 8/2016 Morris et al.
9,430,646 B1 8/2016 Mushtaq et al.
9,432,360 B1 8/2016 Triandopoulos et al.
9,438,614 B2 9/2016 Herz
9,495,188 B1 11/2016 Ettema et al.
9,503,470 B2 11/2016 Gertner et al.
9,547,516 B2 1/2017 Thakkar et al.
9,578,045 B2 2/2017 Jaroch et al.
9,591,006 B2 3/2017 Siva et al.
9,601,000 B1 3/2017 Gruss et al.
9,602,531 B1 3/2017 Wallace et al.
9,606,893 B2 3/2017 Gupta et al.
9,607,146 B2 3/2017 Sridhara et al.
9,609,019 B2 3/2017 Vissamsetty et al.
9,628,498 B1 4/2017 Aziz et al.
9,641,544 B1 5/2017 Treat et al.
9,641,550 B2 5/2017 Kraitsman et al.
9,710,648 B2 7/2017 Weingarten et al.
9,712,547 B2 * 7/2017 Touboul ................ G06F 21/577
9,769,204 B2 8/2017 Vissamsetty et al.
9,781,148 B2 10/2017 Mahaffey et al.
9,807,092 B1 10/2017 Gutzmann
9,807,115 B2 10/2017 Kolton et al.
9,813,451 B2 11/2017 Honda et al.
9,871,766 B2 1/2018 Syed et al.
9,877,210 B1 1/2018 Hildner et al.
9,888,032 B2 * 2/2018 Dekel ..................... G06F 21/60
9,898,763 B1 2/2018 Vaynblat et al.
9,942,270 B2 3/2018 Vissamsetty et al.
10,025,928 B2 7/2018 Jaroch et al.
10,044,675 B1 8/2018 Ettema et al.
10,102,374 B1 10/2018 Cohen et al.
10,169,586 B2 1/2019 Maciejak et al.
10,237,282 B2 3/2019 Nelson et al.
10,250,636 B2 4/2019 Vissamsetty et al.

(56) References Cited

U.S. PATENT DOCUMENTS

| | | | | |
|---|---|---|---|---|
| 10,257,224 | B2 | 4/2019 | Jaroch et al. | |
| 10,284,591 | B2 | 5/2019 | Giuliani et al. | |
| 10,375,110 | B2 | 7/2019 | Vissamsetty et al. | |
| 10,382,484 | B2 | 8/2019 | Shayevitz et al. | |
| 10,476,891 | B2 | 11/2019 | Vissamsetty et al. | |
| 10,509,905 | B2 | 12/2019 | Vissamsetty et al. | |
| 10,542,044 | B2 | 1/2020 | Vissamsetty et al. | |
| 10,567,431 | B2 | 1/2020 | Vissamsetty et al. | |
| 10,574,698 | B1 * | 2/2020 | Sharifi Mehr | H04L 63/1491 |
| 10,599,842 | B2 | 3/2020 | Vissamsetty et al. | |
| 10,599,844 | B2 | 3/2020 | Schmidtler et al. | |
| 10,609,074 | B2 | 3/2020 | Vissamsetty et al. | |
| 10,757,090 | B2 | 8/2020 | Kahol et al. | |
| 10,826,941 | B2 | 11/2020 | Jain et al. | |
| 10,855,671 | B2 | 12/2020 | Kahol et al. | |
| 10,938,854 | B2 * | 3/2021 | Strogov | H04L 63/1416 |
| 11,032,301 | B2 | 6/2021 | Mandrychenko et al. | |
| 11,038,658 | B2 | 6/2021 | Vissamsetty et al. | |
| 11,171,974 | B2 | 11/2021 | Gertner et al. | |
| 11,470,115 | B2 * | 10/2022 | Vissamsetty | H04L 63/20 |
| 11,888,897 | B2 * | 1/2024 | Vissamsetty | H04L 63/10 |
| 2002/0010800 | A1 | 1/2002 | Riley et al. | |
| 2002/0016826 | A1 | 2/2002 | Johansson et al. | |
| 2002/0078382 | A1 | 6/2002 | Sheikh et al. | |
| 2002/0093917 | A1 | 7/2002 | Knobbe et al. | |
| 2002/0095607 | A1 * | 7/2002 | Lin-Hendel | G06F 21/567 726/24 |
| 2002/0178374 | A1 | 11/2002 | Swimmer et al. | |
| 2002/0194489 | A1 | 12/2002 | Almogy et al. | |
| 2003/0065950 | A1 | 4/2003 | Yarborough | |
| 2003/0145225 | A1 | 7/2003 | Bruton, III et al. | |
| 2003/0145226 | A1 | 7/2003 | Bruton, III et al. | |
| 2003/0152034 | A1 | 8/2003 | Zhang et al. | |
| 2003/0188189 | A1 | 10/2003 | Desai et al. | |
| 2003/0223367 | A1 | 12/2003 | Shay et al. | |
| 2004/0083369 | A1 | 4/2004 | Erlingsson et al. | |
| 2004/0172557 | A1 | 9/2004 | Nakae et al. | |
| 2004/0243699 | A1 | 12/2004 | Koclanes et al. | |
| 2004/0255157 | A1 | 12/2004 | Ghanea-Hercock | |
| 2005/0050353 | A1 | 3/2005 | Thiele et al. | |
| 2005/0076235 | A1 | 4/2005 | Ormazabal et al. | |
| 2005/0076238 | A1 | 4/2005 | Ormazabal et al. | |
| 2005/0108562 | A1 | 5/2005 | Khazan et al. | |
| 2005/0138402 | A1 | 6/2005 | Yoon et al. | |
| 2005/0204157 | A1 | 9/2005 | Johnson | |
| 2005/0223239 | A1 | 10/2005 | Dotan | |
| 2005/0240989 | A1 | 10/2005 | Kim et al. | |
| 2006/0085543 | A1 | 4/2006 | Hrastal | |
| 2006/0101515 | A1 | 5/2006 | Amoroso et al. | |
| 2006/0126522 | A1 | 6/2006 | Oh | |
| 2006/0161989 | A1 | 7/2006 | Reshef et al. | |
| 2006/0203774 | A1 | 9/2006 | Carrion-Rodrigo | |
| 2006/0209701 | A1 | 9/2006 | Zhang et al. | |
| 2006/0230129 | A1 | 10/2006 | Swami et al. | |
| 2006/0236401 | A1 | 10/2006 | Fosdick | |
| 2007/0022090 | A1 | 1/2007 | Graham | |
| 2007/0025374 | A1 | 2/2007 | Stefan et al. | |
| 2007/0067623 | A1 | 3/2007 | Ward | |
| 2007/0097976 | A1 | 5/2007 | Wood et al. | |
| 2007/0100905 | A1 | 5/2007 | Masters et al. | |
| 2007/0101431 | A1 | 5/2007 | Clift et al. | |
| 2007/0115993 | A1 | 5/2007 | Cohen | |
| 2007/0143827 | A1 | 6/2007 | Nicodemus et al. | |
| 2007/0143851 | A1 | 6/2007 | Nicodemus et al. | |
| 2007/0177499 | A1 | 8/2007 | Gavrilescu et al. | |
| 2007/0208822 | A1 | 9/2007 | Wang et al. | |
| 2007/0208936 | A1 | 9/2007 | Ramos | |
| 2007/0209070 | A1 | 9/2007 | Yadav | |
| 2007/0226320 | A1 | 9/2007 | Hager et al. | |
| 2007/0240215 | A1 | 10/2007 | Flores et al. | |
| 2007/0250930 | A1 | 10/2007 | Aziz et al. | |
| 2007/0282782 | A1 | 12/2007 | Carey et al. | |
| 2008/0005782 | A1 | 1/2008 | Aziz | |
| 2008/0018927 | A1 | 1/2008 | Martin et al. | |
| 2008/0022000 | A1 | 1/2008 | Furuya et al. | |
| 2008/0034429 | A1 | 2/2008 | Schneider | |
| 2008/0046989 | A1 | 2/2008 | Wahl | |
| 2008/0060074 | A1 | 3/2008 | Okuyama | |
| 2008/0071728 | A1 | 3/2008 | Lim | |
| 2008/0082722 | A1 | 4/2008 | Savagaonkar et al. | |
| 2008/0083034 | A1 | 4/2008 | Kim et al. | |
| 2008/0098476 | A1 | 4/2008 | Syversen | |
| 2008/0104046 | A1 | 5/2008 | Singla et al. | |
| 2008/0127346 | A1 | 5/2008 | Oh et al. | |
| 2008/0162397 | A1 | 7/2008 | Zaltzman | |
| 2008/0168559 | A1 | 7/2008 | Touitou et al. | |
| 2008/0170566 | A1 | 7/2008 | Akimoto | |
| 2008/0229415 | A1 | 9/2008 | Kapoor et al. | |
| 2009/0077664 | A1 | 3/2009 | Hsu et al. | |
| 2009/0089040 | A1 | 4/2009 | Monastyrsky et al. | |
| 2009/0104046 | A1 | 4/2009 | Martin et al. | |
| 2009/0158407 | A1 | 6/2009 | Nicodemus et al. | |
| 2009/0158418 | A1 | 6/2009 | Rao et al. | |
| 2009/0170566 | A1 | 7/2009 | Kwon et al. | |
| 2009/0199296 | A1 | 8/2009 | Xie et al. | |
| 2009/0241173 | A1 | 9/2009 | Troyansky | |
| 2009/0249466 | A1 | 10/2009 | Motil et al. | |
| 2009/0249470 | A1 | 10/2009 | Litvin et al. | |
| 2009/0254973 | A1 | 10/2009 | Kwan | |
| 2009/0288158 | A1 | 11/2009 | Izatt et al. | |
| 2009/0296641 | A1 | 12/2009 | Bienas et al. | |
| 2009/0327688 | A1 | 12/2009 | Li et al. | |
| 2009/0328196 | A1 | 12/2009 | Bovee | |
| 2010/0005339 | A1 | 1/2010 | Hooks | |
| 2010/0077483 | A1 * | 3/2010 | Stolfo | G06F 21/554 726/23 |
| 2010/0122317 | A1 | 5/2010 | Yadav | |
| 2010/0122343 | A1 | 5/2010 | Ghosh et al. | |
| 2010/0169973 | A1 | 7/2010 | Kim et al. | |
| 2010/0269175 | A1 | 10/2010 | Stolfo et al. | |
| 2010/0293615 | A1 | 11/2010 | Ye | |
| 2010/0299430 | A1 | 11/2010 | Powers et al. | |
| 2011/0023118 | A1 | 1/2011 | Wright et al. | |
| 2011/0067107 | A1 | 3/2011 | Weeks et al. | |
| 2011/0078309 | A1 | 3/2011 | Bloch | |
| 2011/0099633 | A1 | 4/2011 | Aziz | |
| 2011/0113427 | A1 | 5/2011 | Dotan | |
| 2011/0138456 | A1 | 6/2011 | Ormazabal et al. | |
| 2011/0141937 | A1 | 6/2011 | Breslin et al. | |
| 2011/0145920 | A1 | 6/2011 | Mahaffey et al. | |
| 2011/0167494 | A1 | 7/2011 | Bowen | |
| 2011/0178930 | A1 | 7/2011 | Scheidt et al. | |
| 2011/0185430 | A1 | 7/2011 | Sallam | |
| 2011/0214176 | A1 | 9/2011 | Burch et al. | |
| 2011/0214182 | A1 | 9/2011 | Adams et al. | |
| 2011/0219443 | A1 | 9/2011 | Hampel | |
| 2011/0219449 | A1 | 9/2011 | St. Neitzel | |
| 2011/0247071 | A1 | 10/2011 | Hooks et al. | |
| 2011/0271341 | A1 | 11/2011 | Satish et al. | |
| 2011/0288940 | A1 | 11/2011 | Hordan et al. | |
| 2012/0023572 | A1 | 1/2012 | William, Jr. et al. | |
| 2012/0030745 | A1 | 2/2012 | Bauer | |
| 2012/0030750 | A1 | 2/2012 | Bhargava et al. | |
| 2012/0079596 | A1 | 3/2012 | Thomas et al. | |
| 2012/0084866 | A1 | 4/2012 | Stolfo | |
| 2012/0106377 | A1 | 5/2012 | Sommers et al. | |
| 2012/0124363 | A1 | 5/2012 | Dietrich et al. | |
| 2012/0137342 | A1 | 5/2012 | Hartrell et al. | |
| 2012/0137367 | A1 | 5/2012 | Dupont et al. | |
| 2012/0144488 | A1 | 6/2012 | Sankruthi | |
| 2012/0151565 | A1 | 6/2012 | Fiterman | |
| 2012/0185563 | A1 | 7/2012 | Sugiyama et al. | |
| 2012/0240182 | A1 | 9/2012 | Marayanaswamy et al. | |
| 2012/0255003 | A1 | 10/2012 | Sallam | |
| 2012/0255004 | A1 | 10/2012 | Sallam | |
| 2012/0291090 | A1 | 11/2012 | Srinivasan et al. | |
| 2012/0297488 | A1 | 11/2012 | Kapoor et al. | |
| 2012/0324094 | A1 | 12/2012 | Wyatt et al. | |
| 2012/0331553 | A1 | 12/2012 | Aziz et al. | |
| 2013/0052992 | A1 | 2/2013 | Lee et al. | |
| 2013/0061097 | A1 | 3/2013 | Mendel et al. | |
| 2013/0080641 | A1 | 3/2013 | Lui et al. | |
| 2013/0086684 | A1 | 4/2013 | Mohler | |
| 2013/0091573 | A1 | 4/2013 | Herz et al. | |

(56) References Cited

U.S. PATENT DOCUMENTS

| | | | |
|---|---|---|---|
| 2013/0097706 | A1 | 4/2013 | Titonis et al. |
| 2013/0111547 | A1 | 5/2013 | Kraemer |
| 2013/0133072 | A1 | 5/2013 | Kraitsman et al. |
| 2013/0152200 | A1 | 6/2013 | Alme et al. |
| 2013/0167236 | A1 | 6/2013 | Sick |
| 2013/0191924 | A1 | 7/2013 | Tedesco et al. |
| 2013/0212658 | A1 | 8/2013 | Amaya et al. |
| 2013/0219217 | A1 | 8/2013 | Seren et al. |
| 2013/0231084 | A1 | 9/2013 | Raleigh |
| 2013/0242743 | A1 | 9/2013 | Thomas et al. |
| 2013/0247190 | A1 | 9/2013 | Spurlock |
| 2013/0290662 | A1 | 10/2013 | Teal |
| 2013/0290729 | A1 | 10/2013 | Pettigrew et al. |
| 2013/0291111 | A1 | 10/2013 | Zhou et al. |
| 2013/0298192 | A1 | 11/2013 | Kumar et al. |
| 2013/0298244 | A1 | 11/2013 | Kumar et al. |
| 2013/0329732 | A1 | 12/2013 | Vyas et al. |
| 2013/0333040 | A1 | 12/2013 | Diehl et al. |
| 2013/0340033 | A1 | 12/2013 | Jones et al. |
| 2013/0346472 | A1 | 12/2013 | Wheeldon |
| 2013/0347052 | A1 | 12/2013 | Choudrie |
| 2014/0046645 | A1 | 2/2014 | White et al. |
| 2014/0053267 | A1 | 2/2014 | Klein et al. |
| 2014/0068326 | A1 | 3/2014 | Quinn |
| 2014/0068779 | A1 | 3/2014 | Tan et al. |
| 2014/0090061 | A1 | 3/2014 | Avasarala et al. |
| 2014/0096229 | A1 | 4/2014 | Burns et al. |
| 2014/0108794 | A1 | 4/2014 | Barton et al. |
| 2014/0123280 | A1 | 5/2014 | Kedma |
| 2014/0137246 | A1 | 5/2014 | Baluda |
| 2014/0150094 | A1 | 5/2014 | Rao et al. |
| 2014/0157366 | A1 | 6/2014 | Ko et al. |
| 2014/0165203 | A1 | 6/2014 | Friedrichs et al. |
| 2014/0215617 | A1 | 7/2014 | Smith et al. |
| 2014/0215621 | A1 | 7/2014 | Xaypanya et al. |
| 2014/0215625 | A1 | 7/2014 | Paul et al. |
| 2014/0237562 | A1 | 8/2014 | Nandakumar |
| 2014/0237595 | A1 | 8/2014 | Sridhara et al. |
| 2014/0237599 | A1 | 8/2014 | Gertner et al. |
| 2014/0245376 | A1 | 8/2014 | Hibbert et al. |
| 2014/0250524 | A1 | 9/2014 | Meyers et al. |
| 2014/0259092 | A1 | 9/2014 | Boucher et al. |
| 2014/0282816 | A1 | 9/2014 | Xie et al. |
| 2014/0283076 | A1 | 9/2014 | Muttik |
| 2014/0298419 | A1 | 10/2014 | Boubez et al. |
| 2014/0349611 | A1 | 11/2014 | Kant et al. |
| 2015/0006384 | A1 | 1/2015 | Shaikh |
| 2015/0007312 | A1 | 1/2015 | Pidathala et al. |
| 2015/0013006 | A1 | 1/2015 | Shulman et al. |
| 2015/0039513 | A1 | 2/2015 | Adjaoute |
| 2015/0074810 | A1 | 3/2015 | Saher et al. |
| 2015/0082430 | A1 | 3/2015 | Sridhara et al. |
| 2015/0089655 | A1 | 3/2015 | Choi et al. |
| 2015/0096048 | A1 | 4/2015 | Zhang et al. |
| 2015/0113616 | A1 | 4/2015 | Sampas |
| 2015/0121524 | A1 | 4/2015 | Fawaz et al. |
| 2015/0121529 | A1 | 4/2015 | Quinlan et al. |
| 2015/0128206 | A1 | 5/2015 | Haim et al. |
| 2015/0128246 | A1 | 5/2015 | Feghali et al. |
| 2015/0143496 | A1 | 5/2015 | Thomas et al. |
| 2015/0150125 | A1 | 5/2015 | Dulkin et al. |
| 2015/0150130 | A1 | 5/2015 | Fiala |
| 2015/0156214 | A1 | 6/2015 | Kaminsky |
| 2015/0163121 | A1 | 6/2015 | Mahaffey et al. |
| 2015/0172300 | A1 | 6/2015 | Cochenour |
| 2015/0195291 | A1 | 7/2015 | Zuk et al. |
| 2015/0199512 | A1 | 7/2015 | Kim et al. |
| 2015/0200928 | A1 | 7/2015 | Burch et al. |
| 2015/0205962 | A1 | 7/2015 | Swidowski et al. |
| 2015/0220735 | A1 | 8/2015 | Paithane et al. |
| 2015/0254161 | A1 | 9/2015 | Baril et al. |
| 2015/0257194 | A1 | 9/2015 | Cho |
| 2015/0264068 | A1 | 9/2015 | Beauchesne |
| 2015/0264077 | A1 | 9/2015 | Berger et al. |
| 2015/0268947 | A1 | 9/2015 | Ionescu |
| 2015/0271200 | A1 | 9/2015 | Brady et al. |
| 2015/0281267 | A1 | 10/2015 | Danahy et al. |
| 2015/0286820 | A1 | 10/2015 | Sridhara et al. |
| 2015/0288706 | A1 | 10/2015 | Marshall |
| 2015/0310196 | A1 | 10/2015 | Turgeman et al. |
| 2015/0326587 | A1 | 11/2015 | Vissamsetty et al. |
| 2015/0326588 | A1 | 11/2015 | Vissamsetty et al. |
| 2015/0326592 | A1 | 11/2015 | Vissamsetty et al. |
| 2015/0326599 | A1 | 11/2015 | Vissamsetty et al. |
| 2015/0350236 | A1 | 12/2015 | Klinghofer et al. |
| 2015/0358345 | A1 | 12/2015 | Clark et al. |
| 2015/0373039 | A1 | 12/2015 | Wang |
| 2015/0381376 | A1 | 12/2015 | Wardman et al. |
| 2016/0028750 | A1 | 1/2016 | Di Pietro et al. |
| 2016/0042179 | A1 | 2/2016 | Weingarten |
| 2016/0042180 | A1 | 2/2016 | Sayre et al. |
| 2016/0055334 | A1 | 2/2016 | Herwono et al. |
| 2016/0055337 | A1 | 2/2016 | El-Moussa |
| 2016/0072838 | A1 | 3/2016 | Kolton et al. |
| 2016/0078365 | A1 | 3/2016 | Baumard |
| 2016/0080414 | A1 | 3/2016 | Kolton et al. |
| 2016/0127352 | A1 | 5/2016 | Xu et al. |
| 2016/0127413 | A1 | 5/2016 | Kraitsman et al. |
| 2016/0142399 | A1 | 5/2016 | Pace et al. |
| 2016/0191554 | A1 | 6/2016 | Kaminsky |
| 2016/0212225 | A1 | 7/2016 | Smith et al. |
| 2016/0261631 | A1 | 9/2016 | Vissamsetty et al. |
| 2016/0285914 | A1 | 9/2016 | Singh et al. |
| 2016/0315909 | A1 | 10/2016 | Von Gravrock et al. |
| 2016/0323300 | A1 | 11/2016 | Boss et al. |
| 2016/0323316 | A1 | 11/2016 | Kolton et al. |
| 2016/0381023 | A1 | 12/2016 | Dulce et al. |
| 2017/0019425 | A1 | 1/2017 | Ettema et al. |
| 2017/0026387 | A1 | 1/2017 | Vissamsetty et al. |
| 2017/0032122 | A1 | 2/2017 | Thakar et al. |
| 2017/0054754 | A1 | 2/2017 | Saher et al. |
| 2017/0093910 | A1 | 3/2017 | Gukal et al. |
| 2017/0126718 | A1 | 5/2017 | Baradaran et al. |
| 2017/0134405 | A1 | 5/2017 | Ahmadzadeh et al. |
| 2017/0141980 | A1 | 5/2017 | Palanciuc et al. |
| 2017/0147796 | A1 | 5/2017 | Sardesai et al. |
| 2017/0149787 | A1 | 5/2017 | Niemela et al. |
| 2017/0149795 | A1 | 5/2017 | Day, II |
| 2017/0149832 | A1 | 5/2017 | Touboul et al. |
| 2017/0171244 | A1 | 6/2017 | Vissamsetty et al. |
| 2017/0180421 | A1 | 6/2017 | Shieh et al. |
| 2017/0206357 | A1 | 7/2017 | Gorelik et al. |
| 2017/0230384 | A1 | 8/2017 | Touboul et al. |
| 2017/0230402 | A1 | 8/2017 | Greenspan et al. |
| 2017/0235967 | A1 | 8/2017 | Ray et al. |
| 2017/0244729 | A1 | 8/2017 | Fahrny et al. |
| 2017/0244749 | A1 | 8/2017 | Shulman et al. |
| 2017/0244755 | A1 | 8/2017 | Tsao |
| 2017/0264639 | A1 | 9/2017 | Sama et al. |
| 2017/0279846 | A1 | 9/2017 | Osterweil et al. |
| 2017/0286676 | A1 | 10/2017 | Weingarten et al. |
| 2017/0302458 | A1 | 10/2017 | Berger et al. |
| 2017/0302653 | A1 | 10/2017 | Ortner et al. |
| 2017/0302665 | A1 | 10/2017 | Zou et al. |
| 2017/0302696 | A1 | 10/2017 | Schutz et al. |
| 2017/0318054 | A1 | 11/2017 | Vissamsetty et al. |
| 2017/0322959 | A1 | 11/2017 | Tidwell et al. |
| 2017/0324774 | A1 | 11/2017 | Ohayon et al. |
| 2017/0324777 | A1 | 11/2017 | Ohayon et al. |
| 2017/0331849 | A1 | 11/2017 | Yu et al. |
| 2017/0331856 | A1 | 11/2017 | Vissamsetty et al. |
| 2017/0346802 | A1 | 11/2017 | Gruskin et al. |
| 2017/0346853 | A1 | 11/2017 | Wyatt et al. |
| 2017/0359370 | A1 | 12/2017 | Humphries et al. |
| 2018/0013788 | A1 | 1/2018 | Vissamsetty et al. |
| 2018/0020005 | A1 | 1/2018 | Beiter et al. |
| 2018/0027006 | A1 | 1/2018 | Zimmermann et al. |
| 2018/0027017 | A1 | 1/2018 | Touboul et al. |
| 2018/0039776 | A1 | 2/2018 | Loman et al. |
| 2018/0048665 | A1 | 2/2018 | Shulman et al. |
| 2018/0063187 | A1 | 3/2018 | St Pierre |
| 2018/0089430 | A1 | 3/2018 | Mayo |
| 2018/0143915 | A1 | 5/2018 | Gonzalez et al. |
| 2018/0146008 | A1 | 5/2018 | Vissamsetty et al. |

(56) References Cited

U.S. PATENT DOCUMENTS

| | | | |
|---|---|---|---|
| 2018/0173876 | A1 | 6/2018 | Vissamsetty et al. |
| 2018/0183815 | A1 | 6/2018 | Enfinger |
| 2018/0248896 | A1 | 8/2018 | Challita et al. |
| 2019/0042745 | A1 | 2/2019 | Chen et al. |
| 2019/0052659 | A1 | 2/2019 | Weingarten et al. |
| 2019/0068642 | A1 | 2/2019 | Araujo et al. |
| 2019/0073475 | A1 | 3/2019 | Vissamsetty et al. |
| 2019/0114426 | A1 | 4/2019 | Cohen et al. |
| 2019/0253453 | A1 | 8/2019 | Vissamsetty et al. |
| 2019/0354355 | A1 | 11/2019 | Jacobson et al. |
| 2019/0379697 | A1 | 12/2019 | Vissamsetty et al. |
| 2020/0143054 | A1 | 5/2020 | Cohen et al. |
| 2020/0218806 | A1 | 7/2020 | Cho |
| 2020/0252429 | A1 | 8/2020 | Vissamsetty et al. |
| 2020/0374087 | A1 | 11/2020 | Vissamsetty et al. |
| 2021/0397710 | A1 | 12/2021 | Cohen et al. |

FOREIGN PATENT DOCUMENTS

| | | | |
|---|---|---|---|
| JP | 2016-512631 | W | 4/2016 |
| JP | 2017-504102 | W | 2/2017 |
| KR | 10-2015-0101811 | | 9/2015 |
| KR | 10-1969572 | | 4/2019 |
| WO | WO 02/27440 | A2 | 4/2002 |
| WO | WO 2010/030169 | A2 | 3/2010 |
| WO | WO 2012/027669 | | 3/2012 |
| WO | WO 2013/014672 | | 1/2013 |
| WO | WO 2015/171780 | A1 | 11/2015 |
| WO | WO 2015/171789 | A1 | 11/2015 |
| WO | WO 2016/024268 | | 2/2016 |
| WO | WO 2016/081561 | A1 | 5/2016 |
| WO | WO 2017/064710 | | 4/2017 |
| WO | WO 2019/092530 | | 5/2019 |
| WO | WO 2019/032728 | | 3/2020 |

OTHER PUBLICATIONS

Chen et al., "MitM attack by name collision: Cause analysis and vulnerability assessment in the new gTLD era." Security and Privacy (SP), 2016 IEEE Symposium on. IEEE (2016).
Dini et al., "Probabilistic Contract Compliance for Mobile Applications", Eighth International Conference on Availability, Reliability and Security (ARES) IEEE, Sep. 2-6, 2013, pp. 599-606.
Gu et al., "Malicious Shellcode Detection with Virtual Memory Snapshots," 2010 Proceedings IEEE Infocom, San Diego, CA, 2010, pp. 1-9, accessed Mar. 6, 2019.
IBM Software, "Stepping up the battle against advanced threats," IBM Trusteer Apex Thought Leadership White Paper, Dec. 2013, WGW03043-USEN-00.
"IBM Security Qradar SIEM Installation Guide" downloaded from http://www.siem.su/docs/ibm/Installation_and_updating/IBM_Security_QRadar_installation_Guide.pdf, printed 2013, vol. 7.2 in 54 pages.
IBM Security Guardium Insights for IBM Cloud Park for Security, printed from https://www.ibm.com/downloads/cas/QY1RYRLP, printed May 26, 2021, in 12 pages.
IBM Security Qradar Solution Brief "Visibility, detection, investigation and response" printed from https://www.ibm.com/downloads/cas/OP62GKAR, printed on May 26, 2021, in 11 pgs.
"IBM Security Trusteer Apex Advanced Malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14-0390.PDF, printed Aug. 5, 2014, in 9 pgs.
IBM Guardium Documentation "Components and Topology", downloaded from https://www.ibm.com/docs/en/qsip/7.4?topic=deployment-qradar-architecture-overview, printed on Jun. 8, 2021, in 3 pages.
IBM Software "Stepping up the battle against advanced threats", downloaded from https://citrixready.citrix.com/content/dam/ready/partners/ib/ibm-global-services/ibm-security-trusteer-apex-advanced-malware-protection/wgw03043usen.pdf, Printed Dec. 2013 in 12 pages.
Laureano et al., M., "Intrusion detection in virtual machine environments. In Euromicro Conference, 2004. Proceedings." 30th (pp. 520-525). IEEE Sep. 30, 2004.
Liu et al., "Detecting Trojan Horses Based on System Behavior Using Machine Learning Method", International Conference on Machine Learning and Cybernetics (ICMLC), IEEE, Jul. 11-14, 2010, pp. 855-860.
IBM, "Qradar Architecture overview", downloaded from https://www.ibm.com/docs/en/qsip/7.4?topic=deployment-qradar-architecture-overview printed May 28, 2021, in 6 pgs.
Moussaileb et al., "Ransomware's Early Mitigation Mechanisms," Proceedings ARES 2018 Proceedings of the 13th International Conference on Availability, Reliability and Security Article No. 2, pp. 1-10 (2018).
Ornaghi et al., "Man in the middle attacks." Blackhat Conference Europe (2003).
Ramachandran et al., "Detecting ARP spoofing: An active technique." International Conference on Information Systems Security, Springer, Berlin, Heidelberg (2005).
Rüdiger Schollmeier, A Definition of Peer-to-Peer Networking for the Classification of Peer-to-Peer Architectures and Applications, Proceedings of the First International Conference on Peer-to-Peer Computing, IEEE (2002).
Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.
Tanium™ Client Management 1.6 User Guide, downloaded from https://docs.tanium.com/client_management/client_management/index.html on Apr. 1, 2021.
Ullrich et al., "IPV6 Security: Attacks and Countermeasures in a Nutshell." 8th USENIX Workshop on Offensive Technologies (2015).
Xu, J-Y; Sung, A.H.; Chavez, P.; Mukkamala, S.; "Polymorphic Malicious Executable Scanner by API Sequence Analysis", Fourth International Conference on Hybrid Intelligent Systems, IEEE Dec. 5-8, 2004, pp. 378-383.
Communication Pursuant to Article 94(3) EPC dated Dec. 11, 2018, for European Application 15 760 520.5, in 7 pages.
Extended European Search Report dated May 9, 2019, for Application No. 16855062.2, in 7 pages.
European Search Report dated Apr. 29, 2021, in European Patent Application No. 18844671 in 38 pages.
Extended European Search Report dated Jan. 25, 2021, for European Patent Application No. 20181537.0, in 10 pages.
Reaqta Hive, A.I. Based Endpoint Threat Response, Whitepaper, 27 pages (Apr. 6, 2017).
International Search Report and Written Opinion dated Feb. 18, 2016, for International Application No. PCT/IL2015/050802, in 10 pages.
International Preliminary Report on Patentability dated Feb. 14, 2017, for International Application No. PCT/IL2015/050802, in 7 pages.
International Search Report and Written Opinion dated Apr. 20, 2017, for International Application No. PCT/IL2016/051110, in 10 pages.
International Search Report and Written Opinion dated Dec. 11, 2018, for International Application No. PCT/US2018/045850, in 12 pages.
International Search Report and Written Opinion dated Aug. 24, 2020, for International Application No. PCT/US2020/033872, in 8 pages.
International Search Report issued in application No. PCT/US2021/050129 on Dec. 21, 2021.
International Search Report in corresponding International Patent Application No. PCT/US2015/29490, dated Aug. 7, 2015, in 2 pages.
Written Opinion in corresponding International Patent Application No. PCT/US2015/29490, dated Aug. 7, 2015, in 6 pages.
International Preliminary Report on Patentability in corresponding International Patent Application No. PCT/US2015/29490, dated Nov. 8, 2016, in 7 pages.

(56) References Cited

OTHER PUBLICATIONS

International Search Report in corresponding International Patent Application No. PCT/US2015/29501, dated Aug. 7, 2015, in 2 pages.
Written Opinion in corresponding International Patent Application No. PCT/US2015/29501, dated Aug. 7, 2015, in 6 pages.
International Preliminary Report on Patentability in corresponding International Patent Application No. PCT/US2015/29501, dated Nov. 8, 2016, in 7 pages.
International Search Report in corresponding International Patent Application No. PCT/US2015/61271, dated Feb. 2, 2016, in 2 pages.
Written Opinion in corresponding International Patent Application No. PCT/US2015/61271, dated Feb. 2, 2016, in 6 pages.
International Preliminary Report on Patentability in corresponding International Patent Application No. PCT/US2015/61271, dated May 23, 2017, in 7 pages.
Office Action dated Jul. 24, 2019, in European Patent Application No. 15760520.5, in 8 pages.
Office Action dated May 31, 2022, in Japanese Patent Application No. 2020-503272, in 7 pages.

* cited by examiner

```xml
1  ?xml version="1.0" encoding="us-ascii"?>
2  <ioc xmlns:xsi="http://www.w3.org/2001/XMLSchema-instance"
3  xmlns:xsd="http://www.w3.org/2001/XMLSchema" id="000129abd-19-attivo-ioc" last-
4  modified="2014-04-17T11:30:05" xmlns="http://schemas.attivo.com/2014/bot000001">
5    <short_description>BotActivity_00128abd-19</short_description>
6    <description>New malicious bot activity detected</description>
7    <authored_by>XXX_Attivo_MDCE_YYYYY</authored_by>
8    <authored_date>2014-04-17T11:30:05</authored_date>
9    <links />
10   <definition>
11     <Indicator operator="OR" id="aaa-bbbb-xxxx-yyyy-1000x">
12       <IndicatorItem id=" aaa-bbbb-xxxx-yyyy-zzzz-001 " condition="is">
13         <Context document="FileItem" search="FileItem/FileName" type="mir" />
14         <Content type="string">fsmgmtio32.msc</Content>
15       </IndicatorItem>
16       <IndicatorItem id=" aaa-bbbb-xxxx-yyyy-zzzz-002" condition="is">
17         <Context document="FileItem" search="FileItem/MD5" type="mir" />
18         <Content type="md5"> AC1223D7740101020304784512ABC12B</Content>
19       </IndicatorItem>
20       <IndicatorItem id=" aaa-bbbb-xxxx-yyyy-zzzz-003" condition="contains">
21         <Context document="Network" search="Network/DNS" type="mir" />
22         <Content type="string">badCandC01.com</Content>
23       </IndicatorItem>
24       <IndicatorItem id=" aaa-bbbb-xxxx-yyyy-zzzz-004" condition="contains">
25         <Context document="Network" search="Network/DNS" type="mir" />
26         <Content type="string"> badCandC02.com </Content>
27       </IndicatorItem>
28       <IndicatorItem id=" aaa-bbbb-xxxx-yyyy-zzzz-005" condition="is">
29         <Context document="PortItem" search="PortItem/remoteIP" type="mir" />
30         <Content type="IP">161.11.35.12</Content>
31       </IndicatorItem>
32       <IndicatorItem id=" aaa-bbbb-xxxx-yyyy-zzzz-006" condition="contains">
33         <Context document="FileItem" search="FileItem/FullPath" type="mir" />
34         <Content type="string">%LOCALAPPDATA%\</Content>
35       </IndicatorItem>
36       <IndicatorItem id=" aaa-bbbb-xxxx-yyyy-zzzz-007" condition="contains">
37         <Context document="FileItem" search="FileItem/FullPath" type="mir" />
38         <Content type="string">decode_update.exe</Content>
39       </IndicatorItem>
40       <IndicatorItem id=" aaa-bbbb-xxxx-yyyy-zzzz-008" condition="contains">
41           <Context document="FileItem" search="FileItem/PEInfo/Type" type="mir" />
42           <Content type="string">Dll</Content>
43       </IndicatorItem>
44       <IndicatorItem id=" aaa-bbbb-xxxx-yyyy-zzzz-009" condition="contains">
45         <Context document="Network" search="Network/URI" type="mir" />
46         <Content type="string">/ews/exchange.asmx </Content>
47       </IndicatorItem>
48       <IndicatorItem id=" aaa-bbbb-xxxx-yyyy-zzzz-010" condition="contains">
```

FIG. 6A

```
        <Context document="Network" search="Network/SNMP" type="mir" />
        <Content type="string"> PASS@WORD </Content>
      </IndicatorItem>
      <IndicatorItem id=" aaa-bbbb-xxxx-yyyy-zzzz-011" condition="contains">
        <Context document="Network" search="Network/SNMP" type="mir" />
        <Content type="string"> COMMUNity01 </Content>
      </IndicatorItem>
       IndicatorItem id=" aaa-bbbb-xxxx-yyyy-zzzz-012" condition="contains">
        <Context document="Network" search="Network/SNMP" type="mir" />
        <Content type="string"> COMMUNity01 </Content>
      </IndicatorItem>
     <IndicatorItem id=" aaa-bbbb-xxxx-yyyy-zzzz-013" condition="contains">
        <Context document="Snort" search="Snort/Snort" type="mir" />
        <Content type="string"> alert tcp $HOME_NET 21 -> $EXTERNAL_NET any (msg:"
       FTP Brute Force Login attempt"; flow:from_server,established;
       content:"530 type threshold, track by_dst, count 10, seconds 120; sid:102353; r
       ev:10;)
       </Content>
      </IndicatorItem >
      </Indicator>
      <Indicator operator="AND" id=" aaa-bbbb-xxxx-yyyy-zzzz-004">
        <IndicatorItem id="4bba1235-f621-40f7-b34f-8c340d9de7ad" condition="contains">
          <Context document="RegistryItem" search="RegistryItem/Path" type="mir" />
          <Content type=
               "string">Software\Microsoft\Windows\CurrentVersion\Run</Content>
        </IndicatorItem>
        <Indicator operator="OR" id=" aaa-bbbb-xxxx-yyyy-zzzz-015">
          <IndicatorItem id="d4e9da77-60dd-4243-9d14-3460b1d90dd2"
               condition="contains">
            <Context document="RegistryItem" search="RegistryItem/Value" type="mir" />
            <Content type="string">\Windows NT\svchost.exe</Content>
          </IndicatorItem>
          <IndicatorItem id=" aaa-bbbb-xxxx-yyyy-zzzz-016" condition="contains">
            <Context document="RegistryItem" search="RegistryItem/Value" type="mir" />
            <Content type="string">\Windows NT\svclogon.exe</Content>
          </IndicatorItem>
        </Indicator>
      </Indicator>
    </Indicator>
  </definition>
</ioc>
```

FIG. 6B

IMPLEMENTING DECOYS IN A NETWORK ENVIRONMENT

INCORPORATION BY REFERENCE TO ANY PRIORITY APPLICATIONS

This application claims the benefit of U.S. patent application Ser. No. 17/822,037 (now U.S. Pat. No. 11,888,897), entitled "IMPLEMENTING DECOYS IN A NETWORK ENVIRONMENT," and filed Aug. 24, 2022, which in turn is a continuation of U.S. patent application Ser. No. 15/893,176 (now U.S. Pat. No. 11,470,115), entitled "IMPLEMENTING DECOYS IN A NETWORK ENVIRONMENT," and filed Feb. 9, 2018. The contents of these applications are incorporated by reference herein in their entirety.

BACKGROUND

MICROSOFT ACTIVE DIRECTORY provides group managed service accounts can be used for SPN (Service Principle name) management. Group managed service accounts provide a single identity solution for services running on a server farm, or on systems that use Network Load Balancing.

An administrator may then manually configure SPN data for managed service accounts. SPNs are used to support mutual authentication between a client application and a service. An SPN is assembled from information that a client knows about a service. Or, the client can obtain information from a trusted third party, such as ACTIVE DIRECTORY. A service principal name is associated with an account and an account can have many service principal names.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 6A and 6B illustrate an example schema generated in accordance with an embodiment of the present invention;

DETAILED DESCRIPTION

Figure 1:
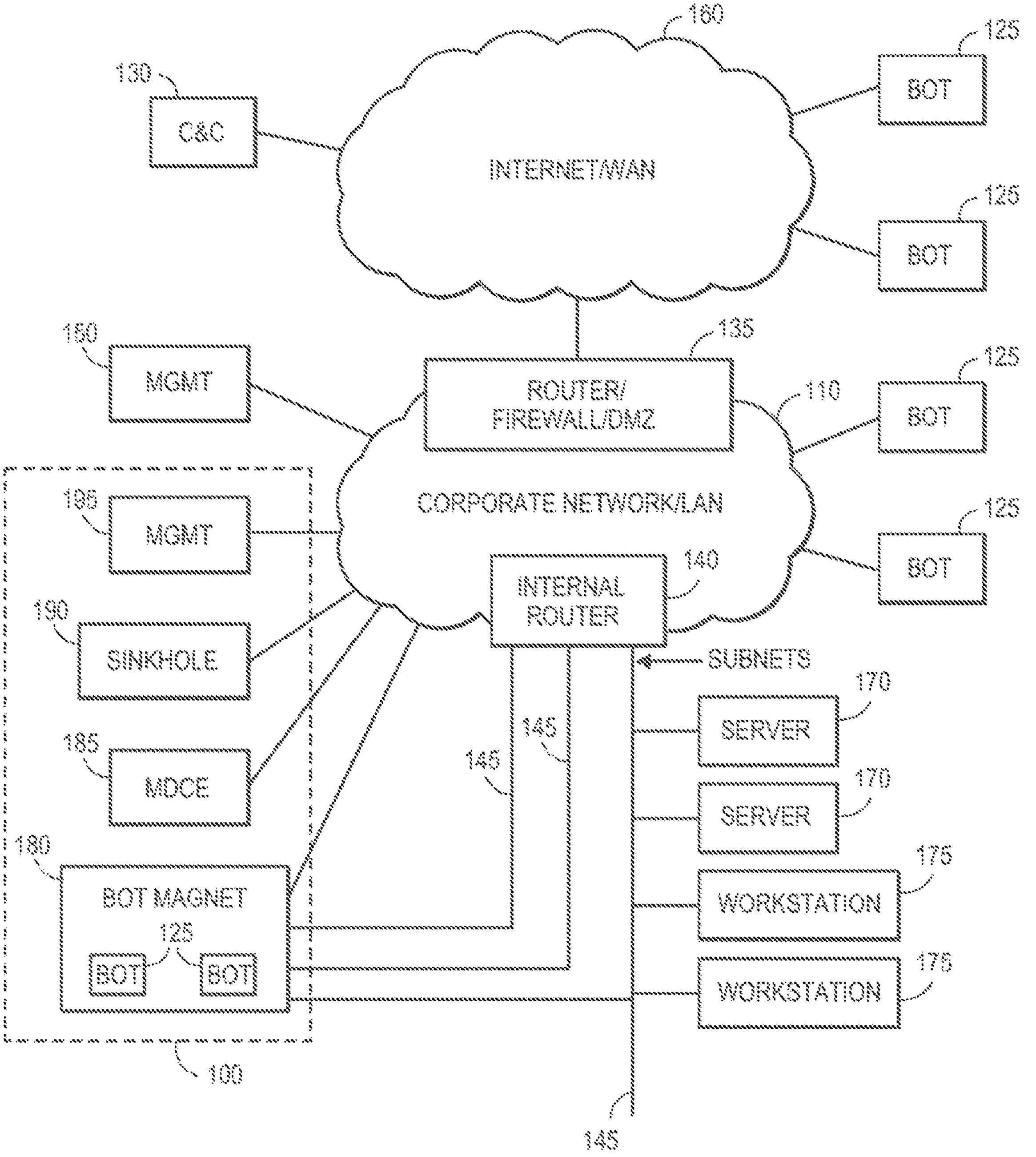
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or a "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as JAVA, Smalltalk, C++, or the like and conventional procedural programming languages, such as the "C" programming language or similar programming languages, and may also use descriptive or markup languages such as HTML, XML, JSON, and the like. The program code may execute entirely on a computer system as a standalone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Conventional honeypots have limitations and shortcomings in areas related to methods of data collection, engagement, detection, supporting multiple operating systems (OSes), services and applications, scaling, number of subnets and IP addresses watched, tapping information from the cloud as well from other sources, correlating multi-dimensional events, identifying Bots, generating incident reports, and are not generally designed to integrate with other existing security solutions in the cloud.

The systems and methods disclosed herein provide an improved bot-detection system that addresses the foregoing limitations of conventional approaches. In one embodiment, virtualization is used to host multiple guest operating systems (GuestOSes) implementing honeypots that provide various types of network services and applications for addressing Bots, logging insider bad behavior, and performing advanced persistent threat (APT) detection.

In one example, a bot-detection system architecture is configured to scale in terms of the number of subnets and total number of IP addresses supported. In another example, a Bot-detection system can be deployed in an enterprise, perimeter, DMZ (referred to in the art metaphorically as the demilitarized zone, because it is meant to isolate the corporate network from potential outside attackers) and/or cloud. In one embodiment, the Bot-detection system architecture may be configured in a single network appliance, referred to herein as the BotSink.

One embodiment is configured to perform novel identification and analysis of Bots and characterizing specific Bot behaviors in real time, allowing Bots to be detected and characterized quickly and accurately. This allows anti-Bot countermeasures to be put in place quickly and effectively. In yet another embodiment, a Bot-detection system may quickly share learned Bot characteristics among a community of interested or affected network sites. This would improve Bot characterizations and would further allow for installations of countermeasures before more Bot attacks occur.

FIG. 1 illustrates one example of a novel Bot-detection approach according to one embodiment of the invention. A computer network 110 is connected to the Internet 160. The network 110 may be owned and operated privately by a corporation, or may alternatively be owned and operated by government, military, educational, non-profit, or other types of entities. The network will be referred to as a corporate network 110 for simplification of discussion, and those skilled in the art will understand that "corporate" may be substituted with other entity types within the spirit and scope of these descriptions. The corporate network is drawn as a cloud, and particular devices are shown with connections to the cloud, and these connections represent various hardware and software configurations known in the art for communicating among devices. A number of devices including routers, switches, firewalls, security appliances, and other devices may be connected at the interface between the Internet 160 and the corporate network 110. In some configurations, this collection of devices 135 is sometimes referred to metaphorically as the "DMZ", where it is meant to isolate the corporate network from potential outside attackers. Additional network devices may exist inside the corporate network, but not included in this illustration to avoid obfuscation of the drawing and related description.

Bots 125 may be present in the corporate network 110 as well as in the Internet 160. A command and control (C&C) facility 130 operated by the originator of the Bots 125 may also be connected to the Internet 160 and communicate with Bots 125 using the Internet 160, through the corporate network 110, and/or using more sophisticated means intended to hide its whereabouts.

The detailed interconnections of devices with each other and with routers, switches, and the like within the corporate network 110 may be made in a variety of ways. For example, routers such as router 140 may further partition the network into multiple subnets 145 for management, performance, resource allocation, and other purposes. End-devices connect to the subnets 145 and may include servers 170 and workstations 175. A management station or server 150 may be used by network administrators to observe and control the network 110.

In one example, the corporate network 110 may be a local area network (LAN), where its elements are often located at a single geographic site. The Internet 160 is drawn as a cloud, and may be a Wide Area Network (WAN), where it connects geographically dispersed sites.

While elements of a corporate network 110 may be co-located at a single geographic site, they also may be located at multiple sites and connected to each other with private links. In the latter case, the overall network may still be represented as a single "corporate network" cloud 110. If desired, the various examples described herein may be used in such a network to protect against internal threats. This may be done in one example by treating certain internal networks, devices, and services with the same circumspection that is applied to the public Internet in other examples described herein. To avoid obfuscation, the examples described herein will assume that all threats are either connected to the corporate network 110 via the public Internet 160 or located within the local corporate network 110 as shown.

The Bot-detection system 100 may have various configurations depending on particular applications. In one example, a server device called the BotMagnet 180 is attached to one or more subnets 145. A plurality of subnets 145 may be connected to the BotMagnet 180 using one physical interface per subnet, or by combining the subnets onto a smaller number of physical links. In one operational example, the BotMagnet may lure and/or engage with Bots 125. In another example, the BotMagnet may allow Bots to infect it, and may also collect data about the Bots' behavior and characteristics.

The BotMagnet 180 may share collected behavioral or character data with a Multi-Dimension Correlation Engine (MDCE) 185. The MDCE may record and correlate information about the behavior of one or more Bots 125, such as for example multiple instances of the same Bot, and may build a new or augment an existing schema and signature that summarizes the Bots' behaviors and characteristics, as described later in the "Schemas and Signatures" section.

In one example, a Bot 125 may gather local corporate data, and may in turn cause such data to be sent back to other Bots 125, to the C&C facility 130, or elsewhere. The BotMagnet 180 may block such potentially harmful "leaks" of private corporate data, and instead gather it in a device called the Sinkhole 190. Software in the Sinkhole 190 can analyze the characteristics of such data to further enhance Bot detection. It can also optionally substitute innocuous data for the private data in order to prolong Bot engagement without harm. The Botdetection system 100 may further include a management station or server 195 used by network administrators to observe and control the operation of the system. Secure methods are used, as appropriate, for communication among elements of the Bot-detection system 100. The attributes and manner of operation of the components illustrated in FIG. 1 are described in greater detail below.

Scaling the Bot-Detection System

Referring again to FIG. 1, a Bot-detection system 100 may be attached to, e.g., in data communication with, a number of subnets in a corporate network 110. The Botdetection system need not connect to all of the subnets in the corporate network, but the system's Bot-detection effectiveness may be improved by connecting to as many subnets as possible. In a large network, it may be desirable or necessary to deploy a larger Bot-detection system in disparate locations. Reasons to deploy a larger system include performance (a corporate network may receive too much attack traffic for a small system to handle), colocation (network may extend over a corporate campus or multiple geographical sites), and case of management (physically located with different equipment clusters or managed by different departments). For example, if the network 110 has several internal routers 140, each of which partitions the network into subnets 145, then it may be desirable to deploy multiple BotMagnets 180, with each one handling all or a subset of the subnets 145 created by one internal router 140.

The MDCE 185 may or may not be replicated in a larger Bot-detection system. In one embodiment, a separate MDCE 185 may be associated with and receive Bot behavioral information from each BotMagnet 180.

However, Bot detection is enhanced if the MDCE can collect and correlate Bot behavioral information from as many sources (BotMagnets 180) as possible, thereby increasing the generality and accuracy of Bot-detection schemas/signatures. Thus, in another embodiment, a single MDCE may collect such information from all the BotMagnets.

Figure 2:
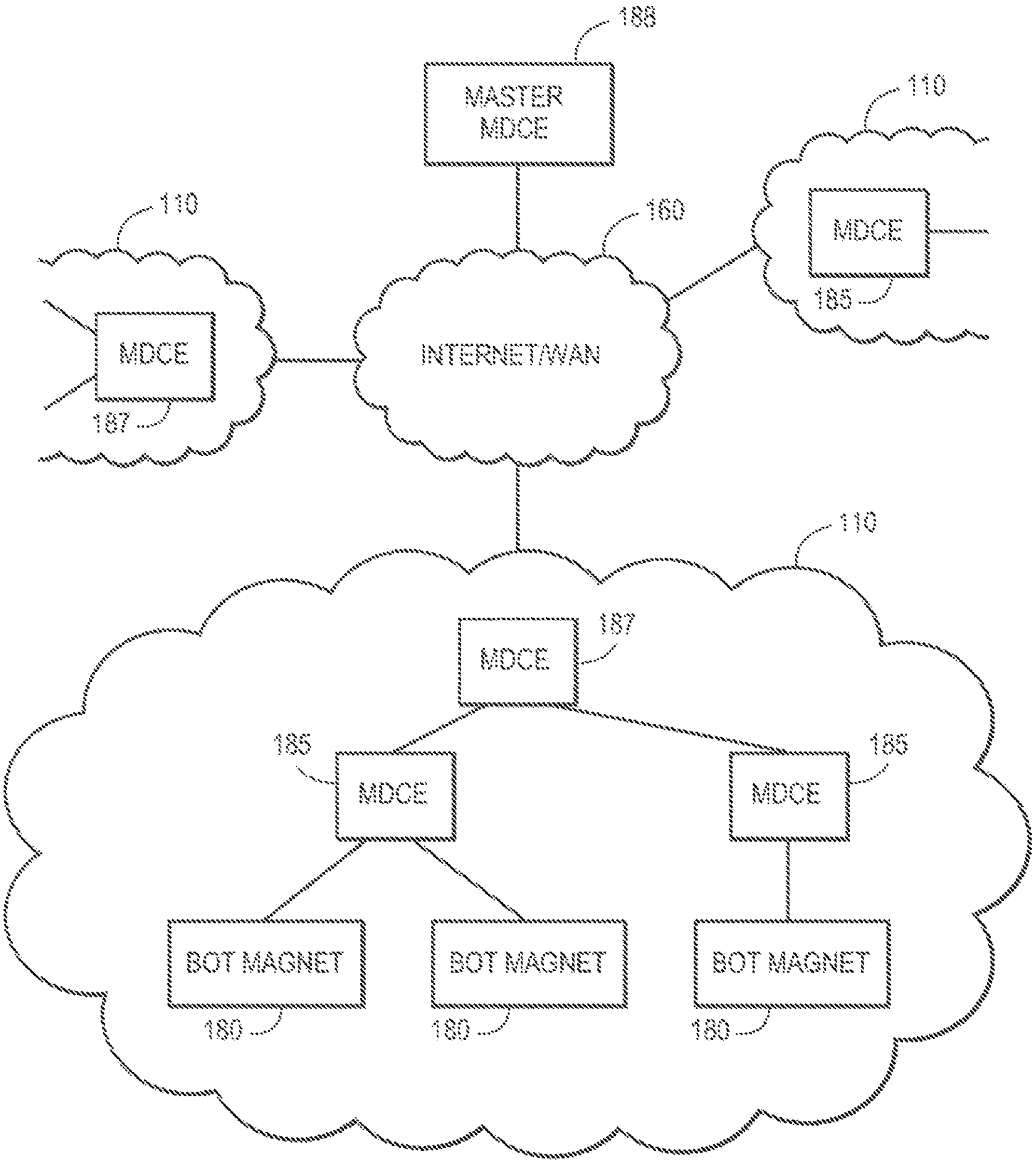
FIG. 2 is a schematic block diagram showing components for implementing methods in accordance with an embodiment of the present invention.

In yet another embodiment, Bot behavioral information may be collected and correlated in a hierarchical way, as shown in FIG. 2. Each first-level MDCE 185 may collect and correlate Bot behavioral information from one BotMagnet 180, or a small number of BotMagnets 180. A second-level MDCE 187 may then collect and further correlate summaries of Bot behavioral information from the first-level MDCEs 185.

The hierarchy may be further extended. In particular, it is possible for an MDCE 185 or 187 to communicate through the Internet 160 with other MDCEs serving other corporate networks 110, for the beneficial purpose of sharing information about new Bot attacks. Such sharing could be done strictly hierarchically, with a "master, top-level" MDCE 188 existing somewhere in the cloud or within a corporate network 110 and maintaining a master database of Bot behavioral information. In some embodiments, advantageously, multiple MDCEs 185 or 187 may have a peer-to-peer relationship, much like the one that exists among other internet devices for distributing routes, providing domain-name services, and the like-continuously updating each other with respect to content generated according to the methods described herein by using methods understood by one skilled in the art.

Referring again to FIG. 1 and to scaling of the Bot-detection system 100, the Sinkhole 190 may also be replicated, with each Sinkhole 190 serving one or a small number of BotMagnets 180. The degree of replication may be dictated by performance requirements, colocation convenience, and other factors.

The Management Station or Server 195 may be replicated. Within a corporate network 110, it is typically desirable to centralize network management. This would suggest managing as many Bot-detection systems 100 with a common Management Station or Server 195, or even integrating system 100 management with an existing, overall Network Management Station or Server 150. But for performance, organizational, or other reasons, it may be desirable to provide a separate Management Station or Server 195 for each Bot-detection system 100, as will be understood by one skilled in the art. As will be understood, this is possible and a hierarchical approach again may be employed.

Virtual Machines (VMs)

A Virtual Machine (VM) is known in the art as an implementation of a computer that operates like a single, standalone computer, but in fact is one of a plurality of such implementations running on a single hardware platform. Historically, the first VMs were pure software implementations; recent years have seen the development of both hardware and software to support easy and efficient deployment of VMs on the latest generations of microprocessors. VMs may be deployed on microprocessors containing a single hardware processor (CPU), as well as on microprocessors containing multiple processors.

A collection of VMs operating on a single microprocessor may be created and controlled by a low-level operating system called a hypervisor. Each VM is in turn controlled by a traditional operating system (OS), which is typically unaware that it is running in a VM rather than on a single, standalone computer. Different VMs on a single microprocessor may run different OSes, and different applications may run on each. VMs controlled by a single microprocessor are typically isolated from each other and cannot communicate with each other using traditional memory sharing and other techniques. Rather, they must communicate with each other through a "network." However, they need not actually communicate over the physical network. Rather, the hypervisor can create simulated networks or "bridges" through which they can communicate, with the hypervisor arranging internally to transfer data from one VM to another.

In one embodiment, a BotMagnet 180 may use a VM to host a GuestOS that appears to be a real server 170 or workstation 175, insofar as other devices in the network are concerned. Using multiple VMs, the BotMagnet 180 can take on the appearance of being multiple servers 170 and workstations 175 at different IP addresses running multiple applications and services for the purpose of luring Bots 125, detecting them, and analyzing their behavior. Further, the BotMagnet 180 may use one or more additional VMs to host its own protected software for overall BotMagnet control and Bot detection and analysis.

The Sinkhole 190 may also include or be embodied by one or more VMs each programmed to receive and analyze the outgoing traffic from GuestOSes that are engaged with Bots 125 within a BotMagnet 180. For example, the sinkhole 190 may implement one VM for each GuestOS that is engaged with a Bot.

Basic Bot-Detection System Operation

The BotMagnet 180 may have one or more interfaces for communicating with subnets 145 in the corporate network 110. The network administrator or some other network management module (e.g., a dynamic host configuration protocol (DHCP) module) configures the BotMagnet 180 with one or more otherwise unused IP addresses from the subnets 145, e.g. assigns an IP address to the BotMagnet by which packets may be addressed to the BotMagnet 180. The network administrator may use the Management Station/Server 195 to perform such configuration. The BotMagnet 180 then may create a GuestOS VM corresponding to each such IP address. Thus, each GuestOS VM may have its own IP address, and through the Hypervisor may also be assigned its own unique MAC address for layer-2 network connectivity. Thus, each GuestOS VM, for all outward appearances, may behave like an independent physical computer communicating at its assigned IP address. Each GuestOS VM is an instance of an operating system, which may be a different OS or version thereof on different VMs. Each GuestOS VM is also loaded with a set of applications, such as web applications and services, which again could be different on different VMs. OSes, applications, and services may be configured either by the network administrator or automatically by the Management Station/Server 195 to ensure that the BotMagnet is hosting an appropriate mix of potentially vulnerable software.

Applications and services existing on a GuestOS VM (or on any server or workstation, for that matter) are accessed by potential clients when clients access them through the network interface. A typical application or service may be accessed using a well known protocol such as TCP or UDP and a "port number" such as SMTP (25), HTTP (80), RLOGIN (513), FTP (20-21), or one of many others. If a computer does not offer a particular application or service, it may discard incoming traffic directed to the corresponding port. Otherwise, it directs such traffic to the appropriate application or service program. Thus, a GuestOS may accept only inbound traffic corresponding to the applications and services that have been configured on it.

Bots 125 and other malicious entities perform "port scans" on target networks in order to find available applications and services, and then engage with them with the goal of finding vulnerabilities that can be exploited to gain further access to the target. A port scan typically attempts communication with all of the IP addresses that might be used in the target network, and for each IP address it attempts all of the port numbers for which it may be able to find a vulnerability.

Thus, if a large proportion of a network's IP addresses are assigned to the Bot-detection system 100, and a large number of applications and services are offered there, there is a high probability that a Bot's port scan will soon encounter a GuestOS VM in the Botdetection system where its behavior will be recorded and subsequently analyzed.

The Bot-detection system 100 is designed to attract Bots 125 and allow them to infect GuestOS VMs, so that behavioral details of Bot operation can be recorded and subsequently analyzed. The GuestOSes in the BotMagnet 180 may have no special mechanisms to prevent Bot infections. Indeed, Bot infections are desired.

Consider a Bot 125 that is able to communicate with a GuestOS VM through the FTP port. It may try to download an executable file such as a copy of itself into the GuestOS file system, and subsequently try to execute it. If these operations would have been allowed by the GuestOS, applications, and services running on a real computer, they will be allowed on the GuestOS VM. The GuestOS VM therefore becomes infected.

Bot operations on a GuestOS VM may advantageously be contained such that they cannot actually harm the corporate network 110 and the devices attached to it. Because of the Bot's containment in a VM, it can be prevented from doing any direct harm. To understand how this is done in some embodiments, the concepts of "inbound" and "outbound" traffic on a VM should first be understood. Inbound traffic is traffic from an external entity that results in the VM taking internal actions, such as allowing the entity to log in or run a service or program, or accepting data that is sent to it, such as storing a file that has been downloaded by the external entity. Outbound traffic is traffic in which the VM sends potentially private data to an external entity. For example, a web page that is normally visible to all external entities is not considered private, while an arbitrarily selected file may be considered potentially private. A basic principle of operation for a GuestOS VM is that it may allow and act upon all inbound traffic from external entities, while it may block all outbound traffic directed to external entities.

For example, suppose the Bot 125 now running within the infected GuestOS VM tries initiate its own port scan of the corporate network, or tries to transfer a file back to its C&C facility 130 using FTP. The BotMagnet 180 may be programmed such that no outbound traffic can be sent from a GuestOS VM to the corresponding connected subnet 145. Thus, the consequences of the infection are effectively blocked, no matter how bad things may look inside the infected GuestOS VM.

On the other hand, it may not be possible to fully record and analyze the behavior of a Bot 125 unless it is allowed to continue its engagement in a meaningful way. The Sinkhole 190 is the system component that makes this possible in some embodiments. For selected inbound traffic, the BotMagnet 180 may be configured to forward such traffic to the Sinkhole 190, which may contain one or more VMs corresponding to each GuestOS VM of the BotMagnet 180 with which it is currently engaged. Each Sinkhole VM may further be configured with the applications and services that it is expected to handle.

For example, if a Sinkhole VM is expected to handle HTTP traffic, then it could be configured with an APACHE Web Server. Outbound traffic from the APACHE Web Server may then be sent back to the requester (such as a Bot 125 elsewhere in the corporate network 110 or Internet 160). The web pages and other information visible through this server would be configured in much the same way as in a conventional honeypot, in order to lure a Bot 125 to engage further without disclosing anything of value. This provides an opportunity to record and analyze the further behavior of the Bot 125 on an infected target.

The MDCE 185 receives extensive log information from both the GuestOS VMs and the Sinkhole VMs, as well as certain information gleaned by the BotMagnet's control software (which manages the VMs). Thus, the MDCE is able to track the engagement and profile the entire lifecycle of a Bot 125. Once the Bot's behavior has been profiled in a schema/signature, the MDCE 185 may create an alert notifying the network administrator, and optionally may distribute the schema/signature to potential victim servers 170 and workstations 175 in the network. As is understood in the art, after receiving an alert, the network administrator may take steps to prevent further infection, such as blocking the attacker at the network DMZ/firewall. Also, upon receiving a schema/signature describing the new threat, antivirus/malware software running on a potential victim can automatically take action when a matching behavior is detected, as is understood in the art. To discover already infected victims, a network administrator can invoke thorough virus/malware-scanning operations to be run on each potential victim, and/or can use standard software tools to examine their log files for behavior patterns that match the schema/signature, as is also understood in the art.

The Bot-detection capabilities of the system 100 are enhanced by the system's ability to capture and correlate events occurring both in the GuestOS VMs when an infection begins, and in the Sinkhole VMs, as the consequences of an infection begin to occur. However, embodiments of the invention are possible with no Sinkhole 190 or no BotMagnet 180.

For example, operating without a Sinkhole 190, it is still quite feasible for a GuestOS VM in the BotMagnet 180 to send log information to the MDCE 185, which can correlate information from this and other GuestOS VMs in order to build a profile, albeit a less extensive profile than what could be done in a complete system. Yet such a system still has the advantage of creating such profiles from multiple infected GuestOS VMs and subnets, and such profiles may also be correlated with Bot information gleaned from other facilities.

Conversely, operating without a BotMagnet 180, it would still be possible for real servers 170 and workstations 175 to be configured with software that collects behavioral information such as logs and sends it to the MDCE 185 for correlation with other information as before. Further, if the real server 170 or workstation 175 is "suspicious" about any activity, for example, based on its origin or behavior pattern, it may forward the session to the Sinkhole 190 for engagement, in much the same way that a BotMagnet GuestOS VM would as described above. In this case, the MDCE can build a more complete profile, because it can correlate behavioral information from both the originally targeted real server 170 or workstation 175 and the Sinkhole 190.

In yet another example, embodiments could be combined with application Ser. No. 14/074,532 filed Nov. 7, 2013, which is incorporated herein by reference in its entirety. The Inspector in that application, instead of redirecting blocked traffic to a Labyrinth, could redirect it to a GuestVM OS in the BotMagnet 180 or directly to the Sinkhole 190. One or more GuestVM OSes and corresponding Sinkhole VMs may be instantiated to handle such traffic, either by configuration or dynamically as needed. As the MDCEs 185, 187, and 188 in present invention are designed to share information with other MDCEs and security services; they could also share information as appropriate with the Cloud Inspection Service (CIS) 262 in application Ser. No. 14/074,532.

For robust operation of the Bot Detection System 100, communication among the BotMagnet 180, the MDCE 185, the Sinkhole 190, and the Management Station or Server 195 should be secure. Conventional methods may be used to encrypt such communication. Also, it is important to ensure that the MDCE 185 and the Management Station or Server 195 cannot become infected, and that BotMagnet 180 and the Sinkhole 190 can become infected only within the GuestOS and Sinkhole VMs as desired, and not within their supporting VMs and processes. This can be ensured, in part, by using secure, private communication between these elements, for example by using secure tunnels. In the Botsink appliance, described next, most of such communication privacy is inherent because communication occurs internal to the appliance.

BotSink Appliance Architecture

Figure 3:
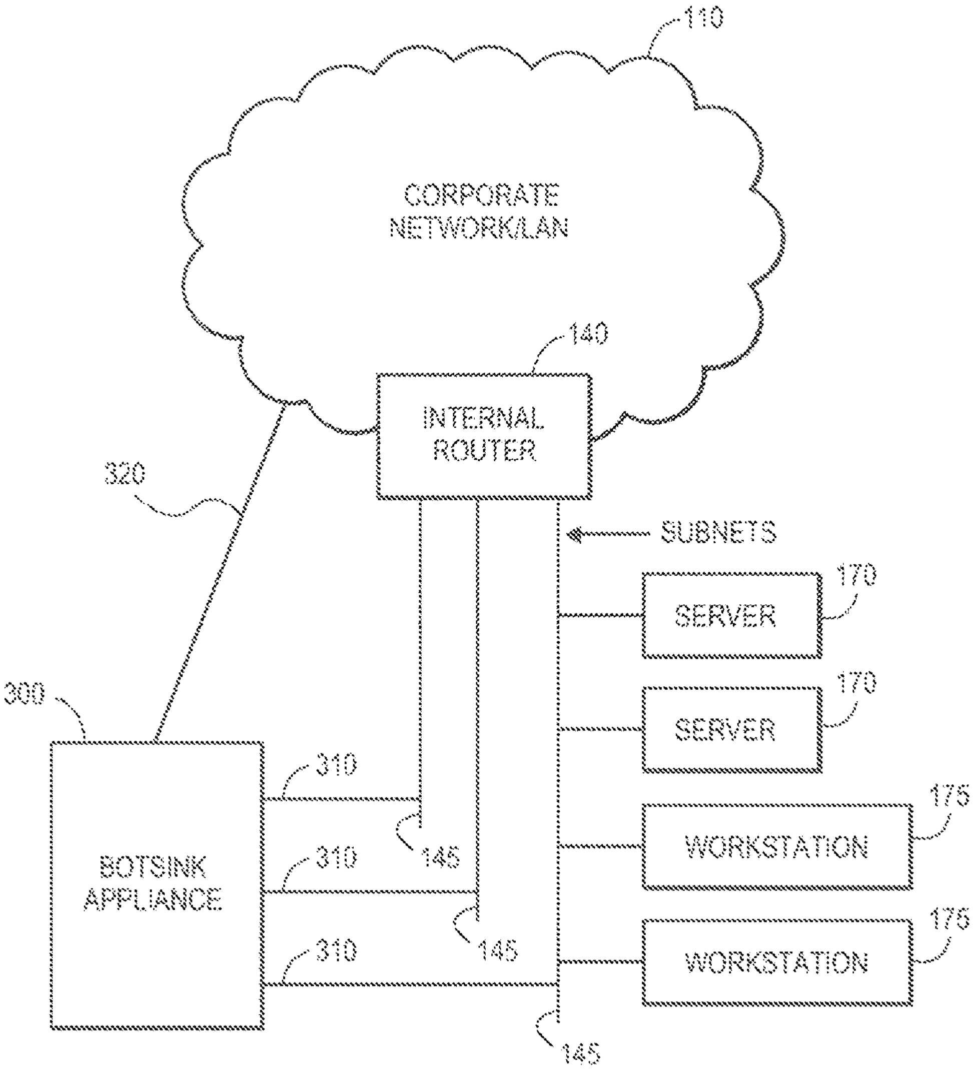
FIG. 3 is a schematic block diagram showing integration of components with a corporate network in accordance with an embodiment of the present invention.

In a preferred embodiment, the Bot-detection system 100 is integrated into a single network-connected device, called the BotSink appliance. As shown in FIG. 3, the BotSink appliance 300 connects to multiple subnets 145, using one or more physical interfaces 310 as discussed previously in connection with FIG. 1. BotSink appliance 300 may also connect through an interface 320 to the corporate network 110 for the purposes of communicating with other BotSinks or standalone MDCEs 185 or 187, Management Stations or Servers 195 or 150, and for any other required purpose. Secure communication is used as appropriate. The interface 320 to the corporate network may or may not use the same physical link(s) as the subnet interface(s) 310.

Figure 4:
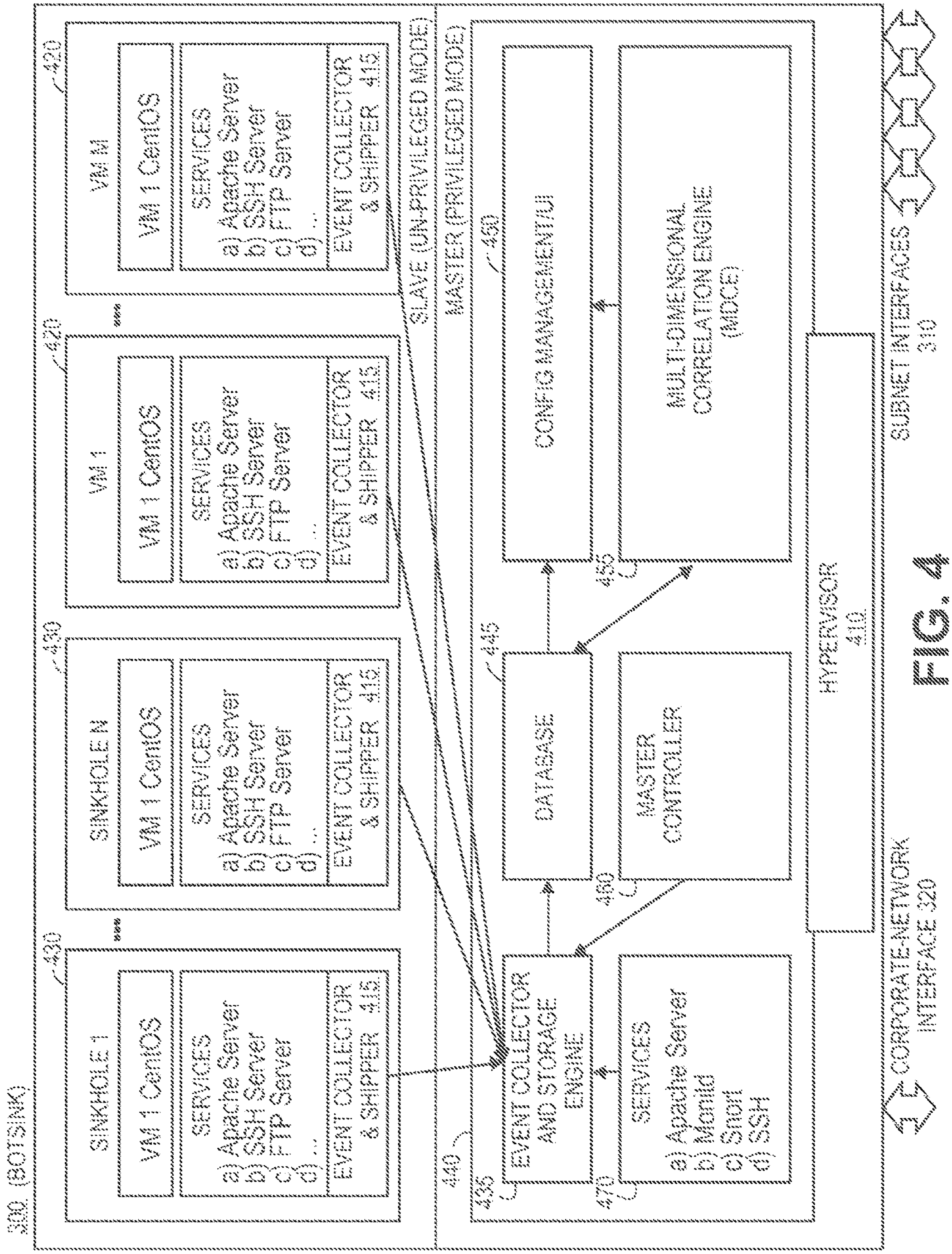
FIG. 4 is a schematic block diagram illustrating virtual machines and other components implemented in accordance with an embodiment of the present invention.
Figure 5A:
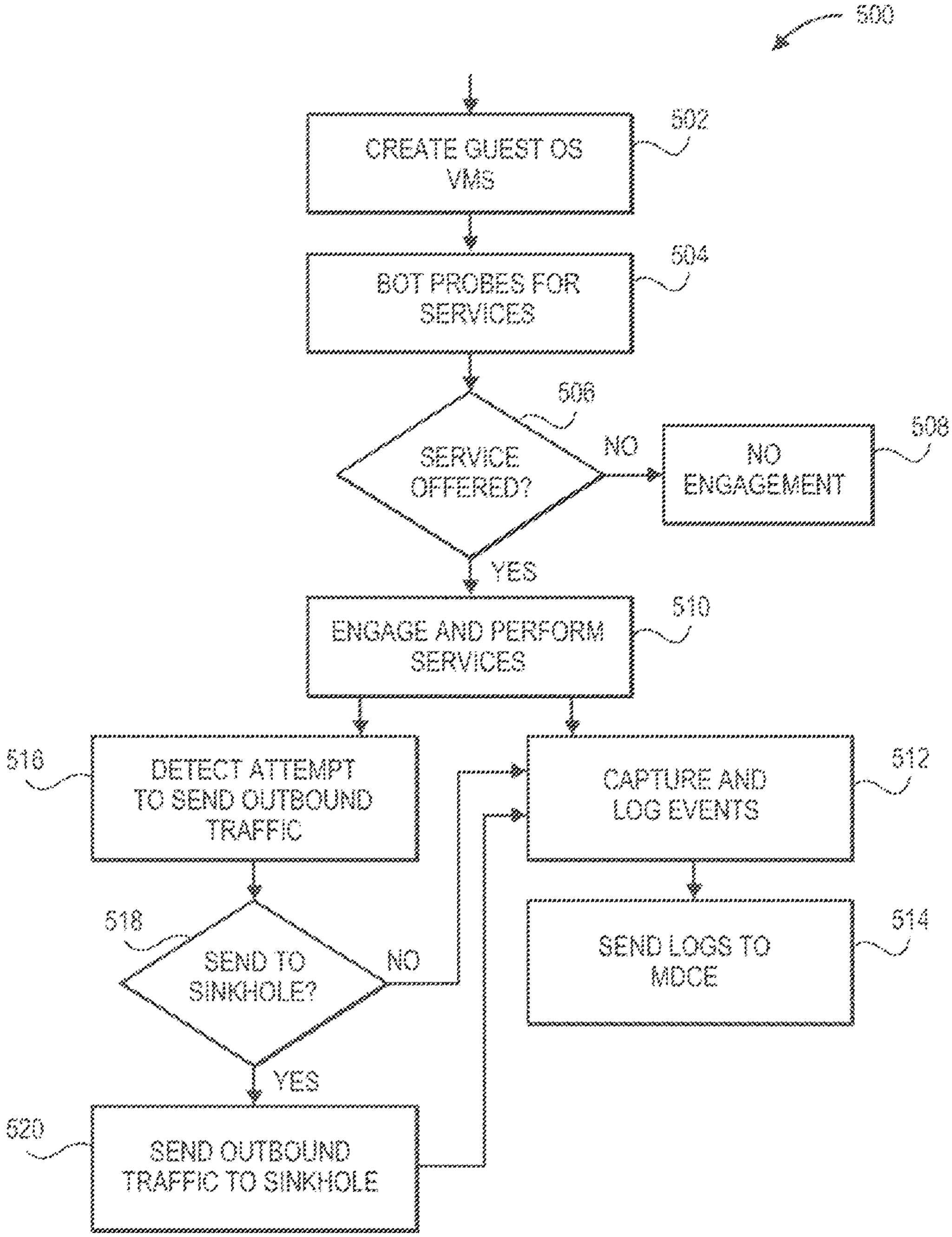
FIGS. 5A through 5C are process flow diagrams of methods for responding to bots in accordance with an embodiment of the present invention.
Figure 5B:
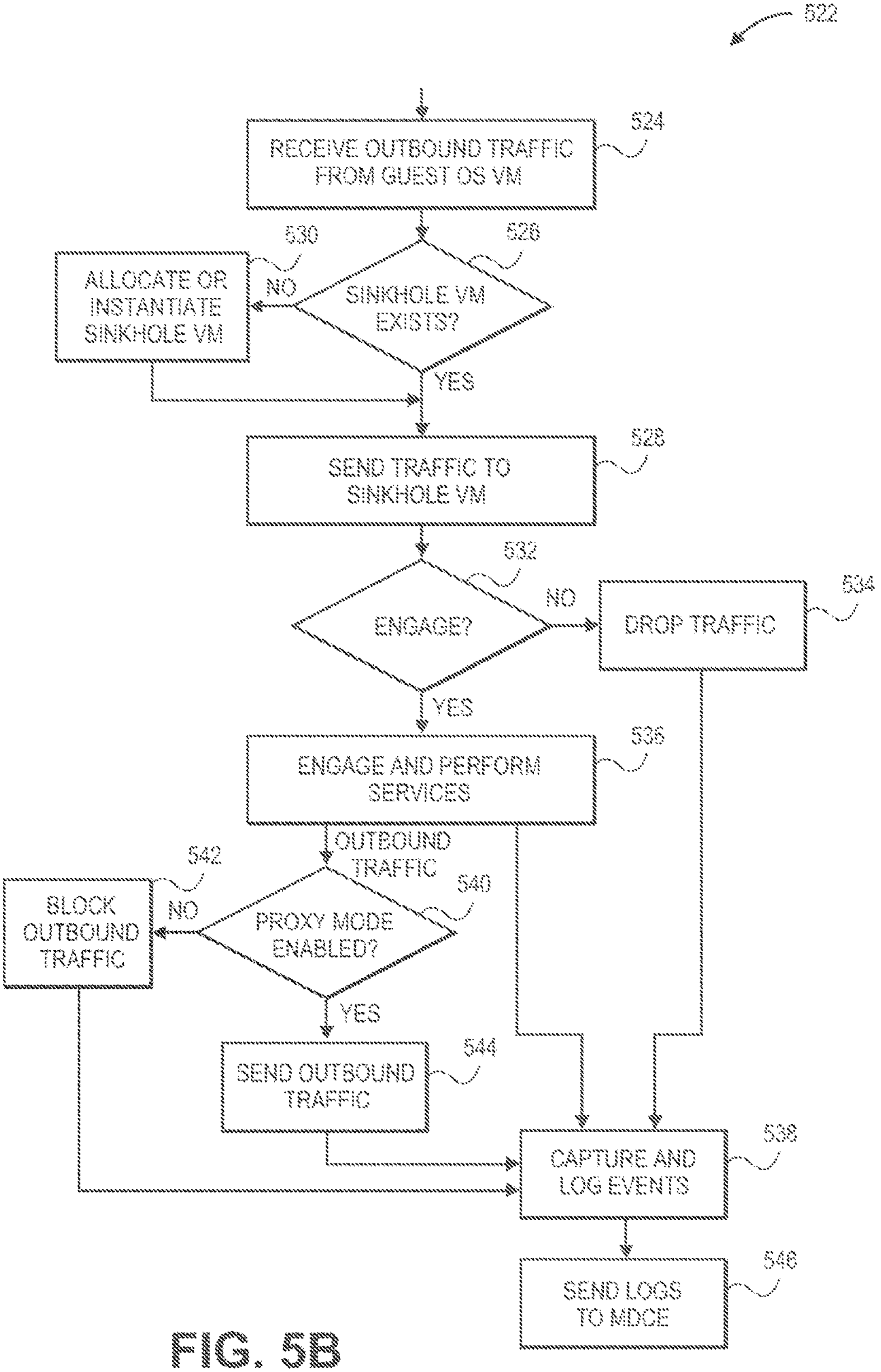
Figure 5C:
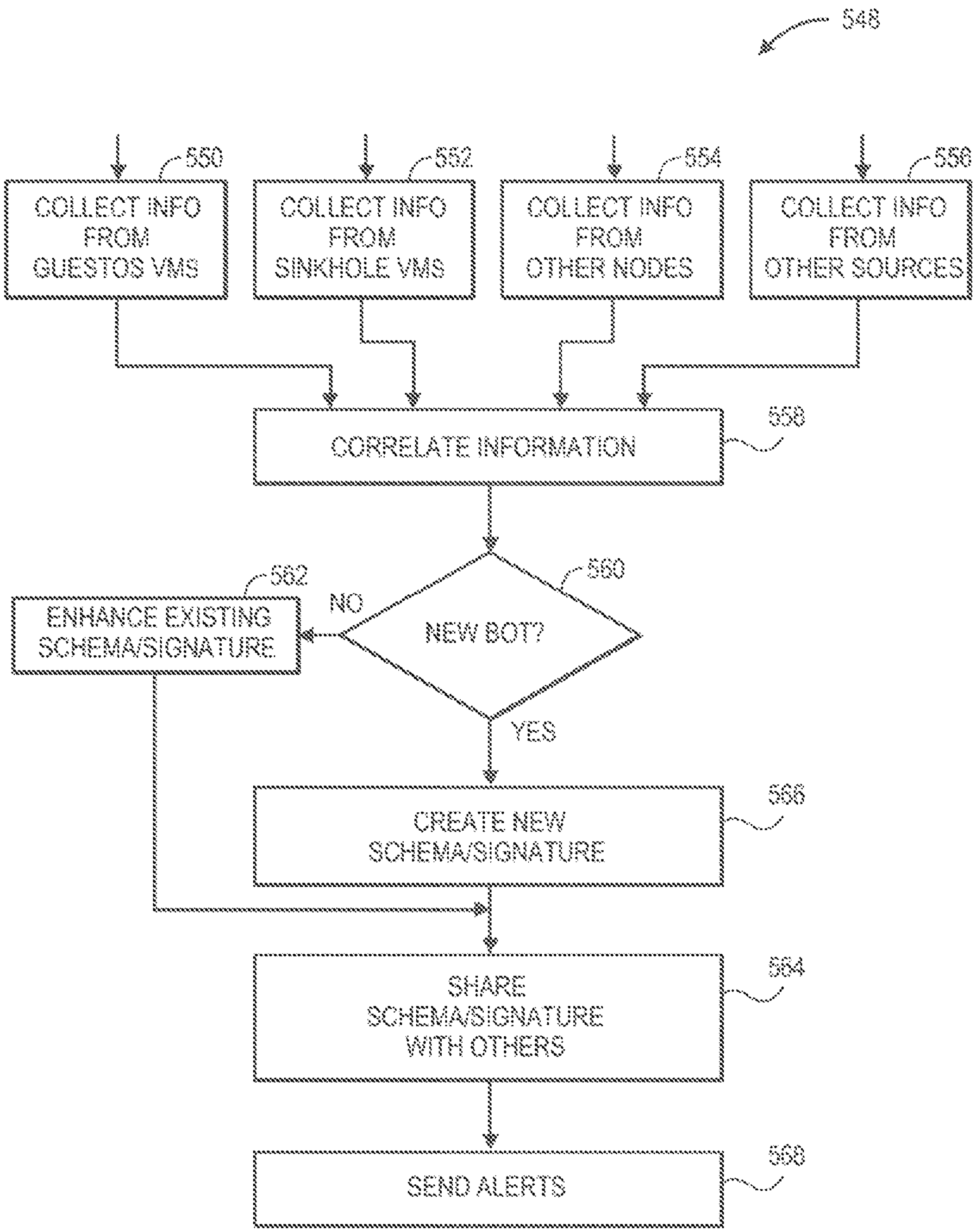

FIG. 4 shows major software components of the BotSink 300. It hosts multiple GuestOSes with multiple services to lure bots and uses distributed processing both for data/traffic collection and analysis. The appliance supports multiple interfaces, both physical and virtual interfaces, that can be plugged into different parts of the physical/virtual networks. The unique features and capabilities of the BotSink appliance are based on a distributed architecture comprising the following components running in multiple VMs:

1. The Hypervisor 410 that provides virtualization.
2. GuestOS VMs 420 for loading different types and instances of operating systems and performing some or all of:
   a. Running various network and applications services
   b. Running, on some or each of the GuestOS VM, the following set of services:
      i. Log collection across various modules
      ii. Transformation of the raw logs into well defined formats
      iii. Forwarding events to a centralized location handled by Log Shipper.
3. Sinkhole VMs 430 to be the destination for selected traffic originating from each of the Guest VMs. 3. The sinkhole VMs 430 perform some or all of the following:
   a. Confining traffic with in the appliance.
   b. Running various network and applications services for engaging with Bots.
   c. Performing event collection, transform and shipping module 415.
   d. Engaging, by a proxy module, with C&C and other traffic communication for a real world interaction.

4. Events Collector and Storage Engine 435 may perform some or all of the following:
   a. Receiving some or all the events from various components running on the different GuestOS and Sinkhole VMs.
   b. Storing some of all of the events in a database 445 for further analysis by the Multi-Dimension Correlation Engine.
   c. Performing event collection, transform and shipping module 415.
5. Multi-Dimension Correlation Engine (MDCE) 455 to correlate events for Bot detection. The MDCE may perform some or all of the following:
   a. Performing bot detection, including correlating the event data and generating meaningful results for detection of Bots. This may include processing events from individual hosts and generating schemas, signatures, and alerts by means of correlation.
   b. Driving or taking actions based on the results of the correlation. Running the correlation as event-driven and possibly at regular intervals.
   c. Achieving a high Bot detection rate since many individual events can be collected from the GuestOS and Sinkhole VMs.
   d. Exchanging information with higher-level MDCEs and other services in the corporate network and/or the Internet for global analytics.
   e. Tapping into the cloud (Internet) for getting real-time information or metadata about BlackList IP address, URLs, virus signatures, social media and crowd-sourced information, and information from security devices and other sources.
6. Master Controller 460 performs some or all of:
   a. Running in the Privileged Mode, this software has total control over each of the GuestOS and Sinkhole VMs instantiated.
   b. Managing, creating and destroying VMs, bridges, and other resources.
   c. Monitoring to ensure all the applications and services are running as necessary.
   d. Managing connectivity of VMs to each other and the network, for example, preventing outbound traffic from a GuestOS VM 420 from going out on a subnet interface 310, and redirects it as required to a Sinkhole VM 430.
7. UI for configuration and reporting 450 performs:
   a. Forwarding of alerts to other Security devices.
8. Additional security and monitoring services 470 may be used by MDCE 455, UI 450, Master Controller 460, and Event Collector 435.

FIG. 4 shows two GuestOS VMs 420, each of which may run one or more network services and applications such as FTP Server, APACHE-based HTTP server, SSH server and so on. Any number of GuestOS VMs may be provided, subject to performance and other resource limitations. On each of the GuestOS VMs, there may be an Event Collector and Shipper 415 that collects events, logs them, and forwards them to the Event Collector and Storage Engine 435. Likewise, two Sinkhole VMs are shown, but any number may be provided to service outbound traffic from the GuestOS VMs 420. The Sinkhole VMs 430 may likewise include one or more web services and resources as the VMs 420 and may likewise include an event collector and shipper 415.

In FIG. 4, the bottom set of software modules 440 ("Master") may be running in Privileged Mode and have higher privileges configured by the Hypervisor 410, compared to the "Slave" GuestOS and sinkhole VMs that run in Unprivileged Mode. The Slave software modules may be off-the-shelf software such as standard releases of various operating systems, web services, applications, and utilities such as event loggers.

Software modules 4-8 listed above may run in a single VM, while in some embodiments they may advantageously be split among a plurality of VMs. As such, they are protected from any of the other VMs. These components may run in Privileged Mode, which means they have access to the Hypervisor 410 to create, destroy, and otherwise access, control and monitor VMs, bridges, and other resources, while in some embodiments the GuestOS of VMs 420 and Sinkhole 430 VMs cannot.

Some or all outbound traffic originating from any of the GuestOS VMs 420 may be either dropped or redirected to a Sinkhole VM 430, thus initially confining potential outbound traffic within the appliance, e.g. system 100. The Sinkhole VM may then allow selected traffic to be passed as is, modified or substituted and returned to the requester (such as a Bot 125) so that engagement may proceed in a harmless manner.

Multiple strategies and methods may be used to harden the Master software modules so that they do not get infected or become targets of an attack. Also, a GuestOS VM 420 being infected may advantageously have no impact on any of the other system components or other VMs, in terms of the CPU usage, resources, and so on, nor on the Master software modules.

Typical System Operation

Figure SA is a flowchart showing an example method 500 of operation of the BotMagnet 180 in a Bot Detection System 100 or BotSink appliance 300. In step 502, GuestOS VMs in the BotMagnet 180 are created and configured to offer various services, applications, and databases. In step 504, a Bot 125 is performing a port scan using the IP (internet protocol) address of one of the GuestOS VMs and is probing for services offered at that IP address. The Bot 125 may be located in the Internet 160, or it may be inside the corporate network 110, running on a server 170 or workstation 175 that has been infected.

In step 506, the Bot 125 is attempting to access the service at a particular port number. If the GuestOS VM does not offer 508 the service it logs the probe, but there is no engagement 508 with the Bot. Logging the probe is useful for automatically detecting port scans. If the service is offered, the Bot is allowed to engage with the GuestOS VM, and the service is performed in step 510. In this step, all of the communication and other activity normally associated with the service occurs.

A typical Bot, once engaged with a service or application on a victim system, looks for vulnerabilities that may allow it exploit the victim system, for example, by downloading, installing, and running an executable file. The executable file typically contains a program that may be able to initiate outbound traffic, and it may be a copy of the original Bot 125 itself, as the Bot attempts to spread itself laterally across the network. Thus, a copy of the Bot 125 may be running inside one or more GuestOS VMs in the BotMagnet 180, as was shown in FIG. 1.

During the engagement, agents in and associated with the GuestOS VM capture and log events in step 512. This step may be performed periodically, e.g., be substantially a continuous activity, that may take place in parallel with the normal activity of the service being performed in step 510. Periodically, or on the occurrence of particular events (such as the Bot attempting to send outbound traffic for the first time), in step 514 activity logs may be sent to the MDCE 185 for correlation with other events logged elsewhere.

During the engagement in step 510, the Bot may attempt to send various types of outbound traffic. One type may be an attempt by the Bot to contact its C&C facility 130. Another type may be an attempt to perform a port scan on other servers 170 and workstations 175 in the local network or beyond, and to infect any vulnerable ones that are found. Yet another type of outbound traffic may be an attempt to send files or other sensitive information (such as passwords, security keys, configuration information, and the like) to the C&C facility 130 or elsewhere.

In step 516, an attempt to send outbound traffic from the GuestOS VM is detected. Like step 512, step 516 is a periodic, e.g., substantially continuous activity, that may take place in parallel with the normal activity of the service being performed in step 510. Ensuring that outbound traffic is blocked or redirected may typically be a function of the Master Controller 460 software module running in Privileged Mode in the BotMagnet 180 or the BotSink 300. In step 518, a decision is made by such software whether to block such traffic or to redirect it to a Sinkhole VM in step 520. In either case, the activity is logged in step 512 for eventual sending to the MDCE in step 514.

When sending of outbound traffic is attempted for the first time in a particular GuestOS VM, the blocking and redirecting software may also be responsible for arranging to allocate or instantiate an associated Sinkhole VM and install and run the appropriate services and applications on it; in the present example this operation is performed by the Sinkhole itself, as will be seen next.

Figure SB is a flowchart illustrating an example method 522 of operation of the Sinkhole 190 in a Bot Detection System 100 or BotSink appliance 300. In step 524, the Sinkhole 190 receives outbound traffic from a particular GuestOS VM which has generated outbound traffic and has decided to send it to the Sinkhole 190 rather than drop it, for example, in step 520 of Figure SA In step 526, the Sinkhole 190 determines whether it already has a Sinkhole VM that is processing outbound traffic from the particular GuestOS VM and, if so, directs the traffic to that Sinkhole VM in step 528. If not, then in step 530 it either allocates a pre-configured Sinkhole VM from an available pool, or instantiates a new Sinkhole VM and configures it with the services and applications that may be needed for the new engagement. In particular, the outbound traffic may be inspected to determine a service or application referenced by the outbound traffic and that service or application may be provisioned on the Sinkhole VM. Once the Sinkhole VM exists and is ready to accept traffic, step 528 directs the outbound traffic to it.

In step 532, the Sinkhole VM decides whether to engage with the Bot 125. The decision whether to engage is based at least in part on the nature of the outbound traffic. If there is no engagement, then the traffic is dropped 534; otherwise it is forwarded to step 536 for engagement.

Whether or not engagement occurs, events and traffic may be captured and logged in step 538. The logging in step 538 is a continuous activity that takes place in parallel with the normal activity of any engagement being performed in step 536. Periodically, or on the occurrence of particular events (such as determining the name or address of the Bot's C&C facility 130 for the first time), activity logs may be sent to the MDCE 185 for correlation with other events logged elsewhere, e.g. events logged by a GuestOS for the same Bot that generated the traffic being processed by the Sinkhole VM according to the method 522.

Any kind of engagement may occur in step 536, if the Sinkhole VM is configured with the appropriate services and other software. For example, if the outbound traffic uses the HTTP protocol, the Sinkhole VM may host an AP ACHE web server (e.g., provisioned on-the-fly to host an APACHE web server) to respond to the Bot's web-page requests and serve up pages that may trap the Bot into continuing the engagement, giving the Bot detection system 100 more opportunities to learn about and log the Bot's behaviors and what it is ultimately looking for.

In another example, the outbound traffic may be a port scan that has been initiated by the Bot 125 in the GuestOS VM. In this case, the software in the Sinkhole 190 may ensure that all port scans are directed to one or more Sinkhole VMs, e.g., one or more other Sinkhole VMs, that offer various services and applications. Thus, the Bot 125 in the local GuestOS VM may be tricked into engaging with a service running on a Sinkhole VM. This provides more opportunities for the Bot Detection System 100 to observe and log the behavior of the Bot 125, such as according to the methods described herein.

In another example, if the outbound traffic uses the IRC (Internet Relay Chat) protocol, then it is likely to be an attempt by the Bot to communicate with its C&C facility 130. In this case, software in the Sinkhole VM may engage with the Bot using the IRC protocol and attempt to learn valuable information about the Bot. For example, it may be able to learn the URL (uniform resource locator) of C&C facility, or the identity of the Bot. If the outbound traffic includes a DNS request to learn the IP address associated with the C&C's URL, a DNS service in the Sinkhole VM may respond with the IP address of the Sinkhole VM itself, thereby fooling the Bot into communicating directly with the Sinkhole VM as if it were the C&C facility, further enhancing the Sinkhole VM's opportunity to learn and log more details of Bot-C&C interaction.

In yet another example, the Bot may be attempting to send in the outbound traffic corporate data that it accessed in the GuestOS VM. In such a case, the Sinkhole VM may simply maintain the HTTP, IRC, FTP, or other communication and data-transfer channel, and log the data that comes across it for further analysis, e.g. report the data to the MDCE 185 as described above.

In the examples above, the Sinkhole VM continues to prevent the original outbound traffic received from the GuestOS VM from leaving the confines of the Sinkhole 190. However, the Sinkhole VM may be configured to optionally enable a feature called Proxy Mode. When the Sinkhole VM attempts to send outbound traffic as a result of the engagement in step 536, step 540 determines whether Proxy Mode is enabled. If not, then the traffic is blocked in step 542 and logged in step 538. If Proxy Mode is enabled, the Sinkhole VM, with the cooperation of the Master Controller 460 software may in step 544 allow the original outbound traffic received from the GuestOS VM to exit the Sinkhole 190. The Proxy Mode software may also modify the source IP address and other information in the outbound traffic so that further engagement occurs directly with the engaging software running on the Sinkhole VM, rather than with the GuestOS VM.

Proxy Mode may be especially useful if outbound traffic is determined to be an attempt by the Bot 125 to communicate with its C&C facility 130. Such traffic activity is monitored in step 538 along with other activities of the Bot. Thus, Proxy Mode may be particularly useful for "Bot research." That is, if the Bot Detection System 100 discovers a Bot whose behavior does not match any previously known Bot, network administrators or others may wish to investigate the Bot further to determine what additional exploits it may be capable of, and what kind of information or resource theft it is ultimately seeking. By enabling Proxy Mode in a carefully controlled environment, the network administrators create the opportunity for Bot communication with the C&C facility 130, so that more information on the Bot and the C&C facility may be revealed. In Proxy Mode, it is also possible for the researchers to modify the outbound traffic to the C&C facility to reveal even more information. As for the method SA, logs of events captured at step 538 may be sent 546 to the MDCE for processing according to the functionality ascribed to the MDCE 455 herein.

Figure SC is a flowchart illustrating an example method 548 of operation of the MDCE 185 in a Bot Detection System 100 or the MDCE 455 software module in a BotSink appliance 300. In step 550, the MDCE collects events and log information from one or more BotMagnets 180. Such information typically may be collected and consolidated from multiple GuestOS VMs and other software on each BotMagnet 180 by a software module such as the Event Collector and Shipper 435 that was described previously in connection with the Botsink 300.

Similarly, in step 552 the MDCE collects events and log information from the Sinkhole VMs and other software running in one or more Sinkholes 190. In step 554, the MDCE collects schemas/signatures and other information from other MDCEs 185, 187, and/or 188. In step 556, the MDCE collects schemas/signatures and other information from other Bot-information sources. Such sources may include publicly accessible services that collect and publish information on known Bots using software such as Snort and formats such as the STIX language to describe IOCs (Indicators of Compromise) and Bot signatures. Such sources may also include privately accessible services with which the operators of the Bot Detection System 100 have cooperation agreements.

In each case above, the events collected are placed into a database where they can be accessed by further steps. In step 558, the MDCE correlates information received from the various sources, to build and enhance Bot schemas/signatures. In particular, it correlates information from each particular GuestOS VM and the associated Sinkhole VM, if any, and determines which information may indicate the presence of a Bot and should be included in a corresponding schema/signature.

In step 560, the MDCE compares a new schema/signature with other schema/signatures in its database and determines whether it may correspond to a new Bot, e.g., a new type of Bot. The other schema/signatures may have been created as a result of other activity in the same Bot Detection System 100, or they may have been received from other MDCEs in step 554 or other sources in step 556.

If step 560 determines that the new schema/signature corresponds to an existing Bot, in step 562 the MDCE may combine the new schema/signature with the existing schema/signature(s) for the same Bot to create an enhanced signature, and update its database accordingly. In step 564, the MDCE may share the enhanced signature, if any, with other MDCEs and publicly and privately accessible Bot-information services.

If step 560 determines that the new schema/signature does not correspond to an existing Bot, in step 566 the MDCE may update its database with the new schema/signature and continue to step 564 to share the new signature with others. It may continue to step 564 immediately or, depending on MDCE configuration or characteristics of the Bot such as potential for damage, it may elect to wait until more activity or more instances of the Bot have been detected.

In step 564, the MDCE may share a new or enhanced schema/signature with Sinkholes 190. Having the ability to access the signatures of both new and previously known Bots may provide useful capabilities in Sinkholes 190. For example, a Sinkhole VM may decide whether or not to enable Proxy Mode or alert a research team depending on whether a Bot that it is engaged with is new or is already well known.

In step 564, the MDCE may also share a new or enhanced schema/signature with servers 170 and workstations 175 that are capable of interpreting such a signature and using it to block any attacks that should be directed at them. For any of the sharing partners above, the MDCE may share some or all of its schema/signature database with others periodically or upon other events, triggers, or requests, not just upon the creation of a new or enhanced schema/signature. In step 568, the MDCE may send alerts to a network administrator and/or others, indicating that a new Bot or an instance of a known one has been detected. If desired, such alerts may be sent earlier in the process, based on configuration or other characteristics of the detected activity, such as the potential for damage.

Schemas and Signatures

As introduced previously, a schema is a multi-element template for summarizing information, and a signature is a schema that is populated with a particular set of values. A schema may have just one or a few elements. However, an aspect of the invention is to base Bot detection not just on one or a few individual events like network behavior or signature but across multiple dimensions across various VMs, services, and applications across multiple subnets. Thus, the schema for describing a particular Bot may have many elements corresponding to the many dimensions, and the values that populate the elements may capture the behaviors of many instances of the Bot. The populated schema may be called a "MultiDimension Bot Lifecycle Signature."

These multiple dimensions can be broadly categorized into, but not limited to, the following:

1. Network activity
   a. Transmit packets
   b. Receive packets
2. Connection tracking
   a. Inbound
   b. Outbound
3. Probes/scans
   a. ARP request/ARP response
   b. TCP SYN, TCP Reset, ICMP redirects and so on
4. Network behavior
   a. Time of activity
   b. Burstiness
   c. Amount of data transferred
5. OS related activity
   a. OS system calls
   b. Call stack
   c. Delay or sleep
6. System activity
   a. Registry key changes
   b. Installation of other programs
   c. File drops
   d. Directory creation
7. Application activity
   a. Authentication (involves audit logs)
   b. Usage of resources 8. Application-related backend activity
   a. Database access
   b. Invoking other utilities and programs
9. Log activity
   a. Log file
   b. Utilities like Firewall, iptables, other security programs, antivirus, and so on
   c. Events detected and reported by other security programs
   d. Snort (intrusion detection and prevention system)
   e. Generate new signature both for C&C as well for the traffic generated by the Bots. These signatures can be exported and shared among security devices.

Such activities may be captured on either of the GuestOS VMs and Sinkhole VMs on which they occur or by which they are detected. In some cases, the capturing is accomplished by small agents that are installed with the GuestOS or Sinkhole software, typically monitoring calls to the OS kernel for various services. How to create and install such agents is understood by those skilled in the art. For example, among other things the Linux Audit System has the ability to watch file accesses and monitor system calls.

In general, monitored activities may include any of the following:

1. file access
2. file modification
3. file transfers (incoming or outgoing)
4. directory creation/destruction
5. registry queries & modifications
6. new-process creation
7. process destruction
8. input/output, including use of cameras and other peripherals
9. keystroke and mouse capture/logging
10. display activity
11. installation or removal of agents An example of a schema written in XML is shown in FIGS. 6A and 6B. For the purposes of illustration, this schema has been limited to a few dimensions and has correspondingly few elements. However, the number of and complexity of the elements may be expanded to describe any desired number of Bot lifecycle behavioral dimensions. The elements of the example schema are described in the paragraphs that follow.

The first nine lines of the example schema in FIGS. 6A and B contain identifying information about the schema itself, such as the name, description, creation date, and author of the schema. The definition of the schema begins at line 10.

On line 11, the "OR" operator specifies that matching any of the elements within its scope creates a match of the schema. Other operations such as "AND" can be used, and logical conditions can be nested as desired. The "id" and its value are for identification and tracking purposes and are placed in the schema by its author, the MDCE in the present example.

The first element within the "OR" operator's scope is specified on lines 12-15. This element matches a file whose name matches the string value "fsmgmtio32.msc", which in this schema is the name of a file that may have been accessed or installed by a Bot.

The next element is specified on lines 16-19, and matches a file whose MD5 checksum equals a specified value. Thus, if the Bot installs the same malicious file in different victims, it will still be matched even if a different filename is used. Or, additional elements could be added to the schema to specify additional variations of filename or MD5 checksum in different instances of the Bot.

The next two elements, on lines 20-23 and 24-27, match a DNS lookup for either of two URLs that may correspond to a C&C facility for the Bot. The element on lines 28-31 matches a particular remote IP address that may be associated with the Bot.

The example schema's list of elements continues in this manner, with each element specifying a value to be matched. The element on lines 60-68 is worth pointing out, as it matches an event detected by SNORT software running in the Master, privileged layer of software in a BotMagnet 180, Sinkhole 190, or BotSink 300. The element on lines 69-86 is also worth mentioning, as it is "composite" element involving several values and two logical operations, designed to match a Microsoft Windows registry entry. The registry-item path must match "Software\Microsoft\Windows\Current Version\Run", AND the registry-item value must match "\WindowsNT\svchost.exe" OR "\WindowsNT\svclogon.exe".

The event and the value to be matched in each element may have been logged originally by a GuestOS VM 420, a Sinkhole VM 430, or in some cases by other software modules running on the BotMagnet 180, Sinkhole 190, or BotSink 300. In any case, it is the responsibility of the MDCE 185, 187, or 188 to determine which events may be relevant to a particular Bot and to incorporate appropriate matching elements as it builds or augments the corresponding schema and the values that are matched, thus creating a multi-dimension lifecycle signature for the Bot.

Multi-Dimension Correlation Engine Details

As previously explained, one component of the Bot-Detection System 100 is the multi-dimension Correlation Engine (MDCE) 185, 455. One function of the MDCE may be to correlate multi-dimension individual events collected across various modules across different VMs to generate a multi-dimension schema and signature corresponding to a Bot 125. That is, the MDCE observes Bot behavior and thereby generates a "Bot Lifecycle Signature" using a schema. The MDCE 185, 455 can import various signatures/schemas from other MDCEs 185, 187, and 188 and from the cloud, as well as transform these schemas for export in various standard formats. The MDCE can reduce false positives by dynamic learning and incorporating other information like white lists and so on.

The MDCE can classify as well as group the events according to the type of Bot infection phases such as those described in the section on Lifecycle of Bot Detection.

The MDCE supports importing of data related to one or more Bots from multiple sources and formats as well feed this data to the MDCE, resulting in better detection. Similarly, Bot related data like signatures, traffic, events, pcap (packet capture) and so on can be transformed into various formats for exporting to other systems. Some of the input/output formats supported are listed below:

1. Open Framework for Sharing Threat Intelligence (OpenIOC) format
2. Structured Threat Information expression (STIX) format
3. SNORT rules/signatures
4. other industry-standard formats that may exist or be developed
5. customized and proprietary formats Actions Taken on Bot Detection On detection of any infection on any of the Guest OS VMs 420 based on the collection of data and events, the Master Controller 460 software module running in Privileged Mode in the BotMagnet 180 is responsible for taking a set of actions on that particular VM without any user involvement. The list of possible actions includes:

1. Stop the service
2. Cleanup by running different Antivirus utilities
3. Destroy the VM
4. Respin the VM
5. Quarantine the VM for further observation
6. Wait for a predefined timeout value, or as configured by user, and then respin the VM.

In any of these cases any outbound traffic from the infected GuestOS VM 420 may always be dropped by the GuestOS VM or it may be redirected to a SinkHole VM 430 which may send it, may modify and then send it, or may drop it, as was explained previously in connection with Figure SB. Hence there may advantageously be no leakage of any outbound traffic from any of the VMs on the BotSink appliance 300.

A Bot's behavior may be similar to one that has been seen before, either by the local MDCE 185, by another MDCE 185, 187, or 188, or by another security service that has shared Bot signatures using a known format. In such a case, the MDCE that has detected the Bot may export the locally constructed signature to these other devices and services to enhance global recognition of the Bot. If the Bot is not recognized-a so-called Day Zero attack—the MDCE may advantageously share the locally constructed signature with other devices and services.

In either case, signatures shared with other MDCEs, devices and services may characterize Bot behavior in much more detail because of unique capability of the Botdetection system 100 to capture very detailed behavioral information from multiple sources over the entire lifetime of the Bot.

Lifecycle of Bot Detection

This section describes a sample Bot and gives details right from the infection phase to the Command & Control (C&C) communication phase. The lifecycle of a Bot infection process may be classified into five stages, called "Bot infection phases":

1. E1—Inbound scanning—scanning a computer within the network.
2. E2—Exploit—when the inbound scan successfully exploits/gains access to use a computer within the network using various exploit attack vectors.
3. E3—Egg download—downloading a copy of the complete Bot to infect and execute on the exploited computer.
4. E4—Outbound scanning—Infected machine within the network scans machines inside or outside the corporate network for vulnerabilities for infecting more systems.
5. E5—C&C engagement—infected machine contacting the command and control center.

The above list of phases may be extended by adding two or more phases, such

1. E6—Infection Phase resulting in payload drop onto a new target.
2. E7—Malicious Traffic generation like generating SP AM, DDOS, etc.

On the other hand, it is entirely possible that some Bots may skip a few phases and may execute the phases in a different order. Also some events, like E4 and ES, can happen independently of each other.

This section details and lists multi-dimension events, their processing and their grouping, which results in detection of the sample Bot by the BotSink system 100 or appliance 300. This also includes the subsequent generation of alerts and target client list reporting. The events listed here may be specific to the Botsink system 100 or appliance 300 implementation and follow a generic format used to log each of the events, as shown below:

1. Time Stamp Field: Indicates the timestamp, such as in UTC format, of when this event was captured
2. Event Name: describes the type of event or a module name responsible for this event.
3. Type: subtype of the event, like request/response
4. Protocol: The transport protocol such as TCP, UDP etc.
5. Flags: Protocol specific information.
6. L2: MAC-layer specific information, like MAC address
7. L3 info: IP addresses of both source and destination, and whether 1Pv4 or 1Pv6
8. LA info: port number of source and destination, service info
9. Extended description: Raw or summary description related to event Two examples of events are:

1. <TimeStamp=1222, Event=ARP, type=request, src Ip=123.2. 1.3, mac=mm:aa:bb:cc:dd:ee:> (where ARP means Address Resolution Protocol).
2. <TimeStamp=225,Event=Network, Type=TCP, subtype=connection established (Event 023, conn established, client IP=x.x.x.x, destination port=yy, target ip, port etc.)> (where TCP is transmission control protocol).

Sample Trace for Bot Called BBB

A Bot installed on a workstation or server initiates a port scan thereby probing to discover new computers for infection to laterally spread itself The BotSink appliance engages with the Bot by responding to all probes that arrive at each of the GuestOS VMs that it hosts. It also logs these probes. The following set of events are triggered:

1. <TimeStamp=1222,Event=ARP, type=request, Ip=x.x.x.x, mac=mm:aa:bb:cc:dd:ee:>
2. <TimeStamp=1223,Event=ARP, type=response, ip=x.x.x.x, mac=mm:aa:bb:cc:dd:ee:>
3. <TimeStamp=224,Event=Network, Type=TCP, Protocol=TCP, Flags=SYN, srcip="x.x.x.x", srcport=mm", destport="aa", destination ip=y.y.y.y">
4. <TimeStamp=225,Event=Network, Type=TCP, subtype=connection established (Event 023, conn established, client IP=x.x.x.x, destination port=yy, target ip, port etc.).

Based on the response, the Bot determines or further probes to determine a set of services enabled on each of the GuestOS VMs. Bots usually probe some of the set of ports that host standard services, that is, one or more standard, well-known ports looking for services like SMTP, IIS server, HTTP/S, FTP and so on.

The Bot tries to exploit a particular service by running a set of known vulnerabilities against that service. If successful, the Bot tries to take control of the target host by setting up a backdoor by means of a payload drop. The payload is usually an executable program intended to take control of the target. The exploit of this vulnerability as well the payload drop result in generation of the following set of events. In this example the Bot is using a password cracking mechanism for the initial attack vector, and then drops in a payload called mmm.exe.

1. <TimeStamp=2222,"Event"="Network, 026", Type=login,027>
2. <TimeStamp=2223, "Event"="Authentication,31", username=028, password=028, authentication status=success 029>

3. <TimeStamp=2224, “Event”=“Network”, EventId=024, data size=453 bytes, Event 044, file name=mmm.exe>
4. <TimeStamp=2225,Event=“Audit”, Audit=file created, permission=xxx, file size=453, file-owner=root, srcip=“x.x.x.x”>
5. TimeStamp=2226,Event=“APP”, AppType=FTP, srcip=“x.x.x.x”>
6. <TimeStamp=2227“Event”=“OS”, Event Id=061, “Type”=“File Store”, “File Permission”=“execute permission on file”)
7. <TimeStamp=2228, Event=OS”, Type=Exection,mmm.exe:>
8. Snort captures all connection establishments and logs them. Individual network services or applications like FTP and HTTP will log each of the events in/var/log/xxx.
9. <TimeStamp=3222,Event=“APP”, AppType=FTP, srcip=“x.x.x.x”>
10. <TimeStamp=3223,Event=“APP”, AppType=FTP filedrop, srcip=“x.x.x.x”>
11. <TimeStamp=3224,Event=“OS”, AppType=file stored, srcip=“x.x.x.x”>
12. Some or all events are tracked/monitored as being executed by the Bot.
13. <TimeStamp=4222,Event=“Audit”, AuditType=directory created, srcip=“x.x.x.x”>
14. <TimeStamp=4223,Event=“OS”, command=mkdir, srcip=“x.x.x.x”>
15. <TimeStamp=4224,Event=“OS”, AppType=file stored, srcip=“x.x.x.x”>

The Event Collector and Shipper 415 module transforms these as well as other events into a fixed format and sends them off to the Event Collector and Storage Engine 435. It may add relevant information like a host name and the like.

The Event Collector and Storage Engine 435 running in the Privileged Mode may collect some or all events from different VMs hosting different GuestOS and feed them to MDCE 185.

The MDCE 1850 may correlate all these individual multi-dimension events, possibly in real-time, to generate one summary alert. The summary alert will be provided to the network administrator with some or all the critical information need to identify the Bot and the infected-targets list. The UI module will provide the network administrator the ability to query all the associated individual events that led to the raising of the summary alert and all other associated data collected as part of individual events.

For Example: <Event=Alert, Priority=!, Severity=!, Description=“Bot BBB detected”, Client IP List=“x.x.x.y”, “x.x.x.x”, file drop name=mmm.exe, protocol=tcp, app=ftp, Related BotInfectionPhaseTransition:Timestamp1:E1, TimeStamp2:E2, TimeStamp3:E3, TimeStamp4:E4, Events=01 1,0222,233,233,343,234,543,2323,>

Some or all individual events that can be generated by the VMs may be mapped to one or more “Bot Infection Phase” numbers. Based on the “Bot Infection Phase” number it is possible to track what phase a particular Bot infection is in and monitor its progress. The “Bot Infection Phase” number transition and the associated individual events are unique for each of the Bots and hence can be used to create a “Bot Lifecycle Phases Signature”:

1. <scan phase=01 1,022,033>
2. <exploit phase=034, 0455>
3. <payload drop phase=0352, 0459>
4. <outbound scan phase=03498, 045522>
5. <c&c phase-02323,2988,88772>
6. <infect others phase=023343,54343>
7. <exploit traffic generation=0877,0982>

Example of BotInfectionPhase Transition for Bot BBB may include:

1. Timestamp1:E1
2. TimeStamp2:E2
3. TimeStamp3:E3
4. TimeStamp4:E4,
5. Events=011,0222,233,233,343,234,543,2323

This “Bot Lifecycle Phases Signature” can be shared with other MDCEs, security components, end points, IPS (intrusion prevention system) devices and so on and helps them to quickly identify behaviors seen on those systems as corresponding to Bot activity or not. Based on this information, the Bot can be quickly terminated and threat mitigated, for example, by quarantining devices whose event logs contain events matching the Bot’s now-known behavior. It is also possible to safeguard private data at the network level by configuring filters on Internet-connected routers to block all outbound traffic destined for the C&C facility’s now known address.

Some or all other security appliance/components existing in a network can be configured to drop and/or quarantine any traffic originating from any of the IP addresses that have been assigned to the BotSink Appliance 300. In some embodiments, a signature or schema generated according to the methods described hereinabove may be formatted and contain some or all of the types of data in the example schema shown in FIGS. 6A and 6B.

Figure 7:
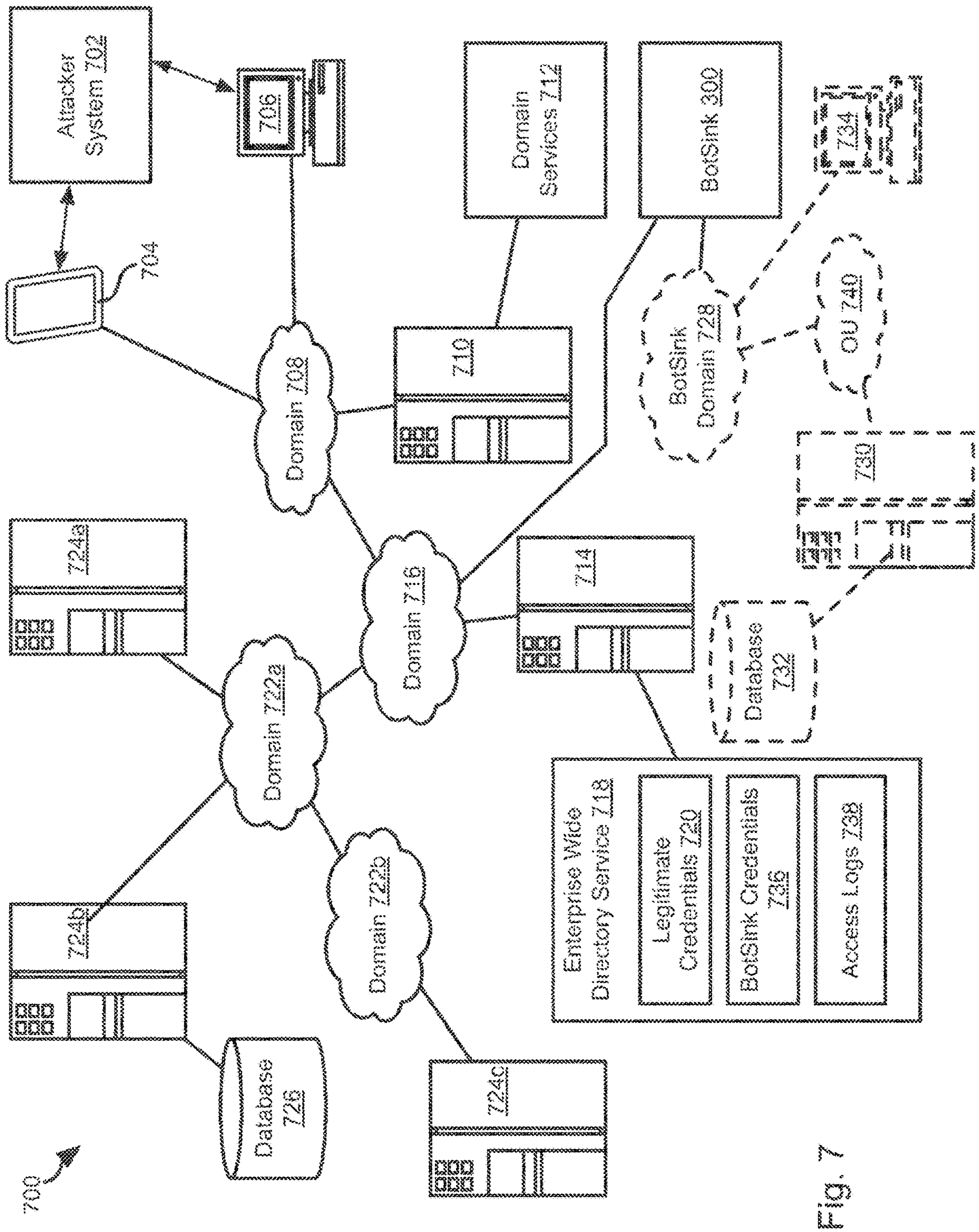
FIG. 7 is a schematic block diagram of an example environment for implementing methods in accordance with an embodiment of the present invention.

Referring specifically to FIG. 7, the illustrated system 700 may be used to detect infiltration of an ACTIVE DIRECTORY service. A directory service functions as databases that map and store the names of network resources to their respective network addresses. Users referencing network objects need not remember the physical address of the object. The directory may store network resources and those resources may or may not have a name. The directory can also store user identifiers (very common), departments of user identifiers, access level of user identifiers, hosts accessible by user identifiers, the access level associated with each user identifier. The directory may further store organizational details, a network topology, an IT policy, and the like. Although ACTIVE DIRECTORY, the most popular directory server, depends on DNS very heavily, it is distinct therefrom and provides much more than a simple mapping between domain names and IP addresses. In particular, directory services may perform authentication for access to resources as well. LDAP (Lightweight Directory Access Protocol) is one of the popular methods available to access the data in directory services. LDAP also provides authentication and authorization to let user access resources in directory services.

Directory services provide authorization and access to key assets in corporate networks. Attackers use various methods of exploitation to get unauthorized access directory services. Once an attacker obtains access to a directory service, the attacker can easily log into key servers, databases etc. by impersonating credentials stored in directory services. The attacker may then exfiltrate data. For example, confidential data may be disclosed (such as occurred recently in the data breach at Sony Pictures). In some instances, unauthorized modifications could be made (such as new account creation, access control modifications, document forgery, backup corruption, unauthorized financial transactions etc.) or data may be made unavailable (such as crypto malware, bank account takeover, bringing down or defacement of corporate web servers).

The systems and methods disclosed herein incorporate database deception into directory services so that attackers cannot differentiate between real production assets with respect to fake assets. Once an attacker access fake credentials pointing to a BotSink 300, the system prevents outbound access and simulates access to actual enterprise assets. This enables the identification and analysis of attackers for use in preventing data breaches.

"ACTIVE DIRECTORY" (AD) is one of the directory services supported by WINDOWS operating systems. The AD domain controller is a server that provides authentication services within a domain whereby it provides access to computer resources. AD provides a database storing information about objects. Each object can be a user, computer, or a group of users. Although the systems and methods disclosed herein are described for use with an ACTIVE DIRECTORY system, they may be applied with equal effectiveness to any directory service.

The systems and methods described herein plant records in a corporate ACTIVE DIRECTORY domain for one or more accounts. These domains lure threat actors to use those accounts. However, use of such accounts results in engagement of the attacker with the BotSink 300 and other resources described herein. This enables early detection of malicious intent and account misuse and diverts attention from real targets and resources.

The threats mitigated by the systems and methods disclosed herein include the following:

(A) An attacker gains read access to whole or part of the directory service and is about to probe resources using the account names or servers learned from this access.

(B) An attacker gains full access to the directory service (e.g. as domain administrator) and exfiltrates user and computer information for subsequent use in a large scale or methodical attack on the organization later based on the attacker's intent and controls that are in place.

(C) An attacker gains access to a client or server that has cached AD credentials. The user name and/or password for the credential is subsequently cracked. The attacker then proceeds to probe resources using the account name and/or password to discover what other access is granted to the newly compromised account.

(D) An attacker gains access to a client that has cached Kerberos credentials for single sign on purposes. The actor then proceeds to use the bits to gain foothold on other machines or gain access to other resources.

The systems and methods disclosed herein provide functionality mitigating the threats above. In particular, the user account(s) may be placed in a corporate AD (see threats A and B). A BotSink 300 may join the corporate AD in order to engage attackers (see threats A and B). The BotSink 300 may grant the user accounts access to certain resources hosted on BotSink 300 and nothing else (see threats A and B). The system may further use or simulate use of the user accounts in engagement VMs of the BotSink 300 (see threats A, B, C, and D). The user accounts may point to information relay entrapment systems (IRES) (see threads C and D). Unusual activity with respect to the user accounts in the AD event log may be detected and monitored (see threats A, B, C, and D).

As shown in FIG. 7, an attacker system may gain access to a user computer, such as a mobile phone 704, workstation 706, laptop computer, or any other type of computing device. Once access to a user computer 704, 706 is obtained, an attacker may then attempt to infiltrate a domain 708 to which the user computers 704, 706 are connected. This may include infiltrating one or more servers 710 of the domain 708 and any services 712 implemented by the server 710. The user computers 704, 706 or server 710 may have credentials cached from previous access to an AD server 714 in the same domain 708 or a different domain 716. The attacker may then attempt to crack the username and password for an account with authorized access to the AD server 714. Having done so, the attacker may then use the directory service 718 of the AD server 714 to access credentials 720 to other network resources. The attacker may then use these credentials to infiltrate other domains **722*a*-722*b* and other servers 724*a*-724*c* in these domains in order to obtain access to network resources, such as databases 726**, email servers, and other network resources.

It is difficult to detect such attacks. In particular, an attacker who obtains administrative access to the directory service 718 and has access to legitimate credentials 720 for various network services will then be able to access these resources in an authenticated manner. Accordingly, the BotSink 300 may implement a virtual domain 728 and one or more network services 730, which may include a virtual database 732 storing decoy data. The BotSink 300 may further include VMs 734 simulating user computers accessing user accounts.

The BotSink 300 may further store or invoke storage of BotSink credentials 736 that reference the network services 730 in the directory service 718. For example, the directory service 718 may store credentials that enable a user to log in to the network services 730. In particular, a user may log in to the server 714 using a user name and password that has one or more credentials 736 associated therewith. The server 714 will then use the credentials 736 to access the network service 730. The legitimate credentials 720 are accessed in a similar fashion.

Access logs 738 may be stored by the server 714 and indicate when credentials 720, 736 are used. In order to simulate a legitimate network service 730, the BotSink 300 may periodically invoke access of the credentials 736 by a VM 734 in order to create entries in the access logs 738 indicating recent use and avoid creating an observable difference between the credentials 736 and the credentials 720.

As is apparent in FIG. 7, the AD server 714 and its domain 716 may be coupled to one or more other domains 708, **722*a*, 722*b*. The organization of these domains may be hierarchical. Accordingly, a domain, e.g. domain 722*a* may have one or more child domains 722*b*. The BotSink domain 728 may be a sub-domain of any other of these domains. However, the BotSink domain 728** may be isolated from all other domains.

In some embodiment each domain may be embodied as an Organizational Unit (OU). OUs are an ACTIVE DIRECTORY container, which hosts users, groups, computers and other units. OUs can contain other OUs and form a hierarchal model. Users can apply security polices at the OU level. Accordingly, the BotSink domain 730 may instead by an OU within a domain 708, 716, **722*a*, 722*b* or a parent OU within any of these domains. Accordingly, the BotSink 730 may implement an OU within a domain or OU that also includes actual production network resources (i.e., non-decoy computers, and network servers performing actual production tasks of an enterprise and handling actual production data). Alternatively, the BotSink domain 728 may implement an OU 740 of which the network 730** is a part.

Regardless of the location of the BotSink 300 within production domains or OUs or in a separated domain or OU, the OU of the BotSink 300 may be isolated from other computer systems and network assets of the parent OU of which it is a part. The BotSink 300 can create multiple fake OUs and add engagement (decoy) VMs, applications, user accounts, etc., and add them to the OUs. The BotSink 300 may also create security policies and provides access rights to limit access to the BotSink 300.

Figure 8:
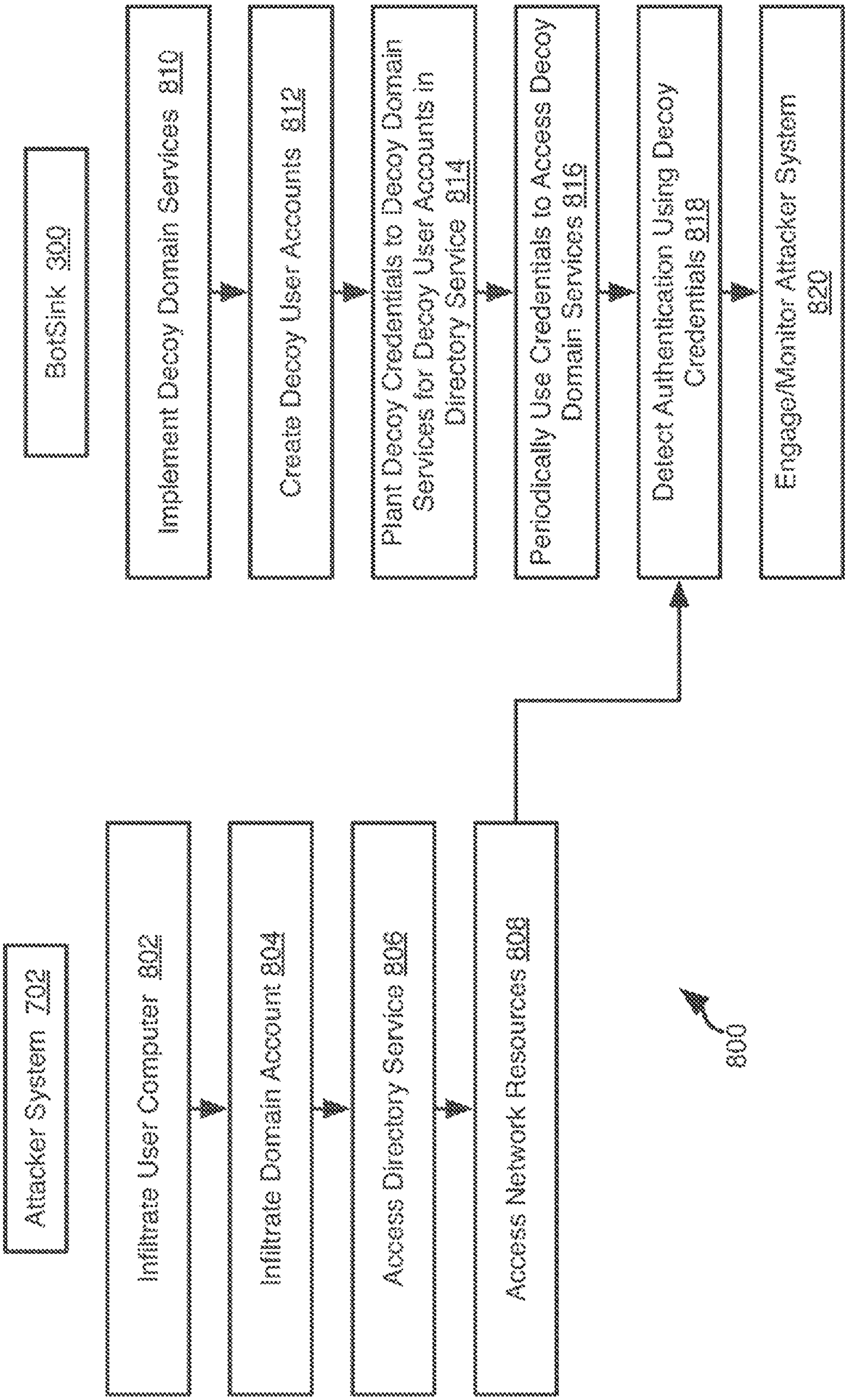
FIG. 8 is process flow diagram of a method for detecting infiltration of an ACTIVE DIRECTORY server in accordance with an embodiment of the present invention.

FIG. 8 illustrates a method 800 that may be performed in the context of the illustrated system 700. Steps 802 through 808 illustrate steps that may be performed by an attacker system 702 when infiltrating an AD server 714. Steps 810-820 may be performed by the BotSink 300 in order to detect such an attack quickly such that measures may be taken to reduce its impact.

The method 800 may include infiltrating 802 a user computer. This may include any method known in the art for gaining unauthorized access. Infiltrating 802 the user computer may include one or more of obtaining access to data stored on the user computer, gaining control of the user computer, or being able to observe traffic into and/or out of the user computer. In either case, the infiltration may enable the attacker to identify a network domain (e.g., OU) to which the user computer belongs, specifically a domain account for which the infiltrated user computer has a credential. Using this credential, the user may then infiltrate 804 the domain account. In particular, the attacker may access 806 the AD server 714 using the credential thereby learning the identity of the AD server 714 and gaining access to any services to which the domain account has access. The attacker may then proceed to access 808 these services in order to access other data and gain control of other computer systems. Where the user account is an administrator account, then the access of the attacker may be unlimited and undetectable.

In preparation for such an attack, the BotSink 300 may implement 810 decoy domain services. The decoy domain services may include an email server, database server, web server, or other type of server. The decoy domain services may be instantiated and executed within a VM executed within the BotSink 300. Multiple domain services may be implemented in multiple VMs with simulated network connections (e.g. bridges) therebetween. Thus, the BotSink 300 may simulate an actual network with multiple nodes. The BotSink 300 may further execute one or more VMs simulating user computers accessing the domain services implemented by the BotSink 300. In particular, the BotSink 300 may create 812 user accounts for each of the domain services 810. The domain services may then be access with authentication information for the user accounts may be the VMs simulating user computers. In some embodiments, the user accounts created at step 812 may be administrator level accounts, which are very attractive to attackers seeking to infiltrate a corporate network.

The method 800 may further include planting 814 credentials for the decoy domain services for the decoy user accounts on the AD server 714. In particular, the AD server 714 used the credentials to access the domain services AD by a user authenticated for the user account or having administrative privileges. In use, the AD server may first receive a username and password from a user. If the user name and password correspond to a valid account, then the AD server may use the credential to authorize access of the user to the decoy domain services or other legitimate services implemented by other servers.

The method 800 may further include periodically using 816 the credentials to access the decoy domain services. For example, a VM on the BotSink 300 simulating a user computer may periodically log on to the AD server 714 and request to access the decoy domain services implemented at step 810. In response to such requests, the AD server 714 records this access in the access logs 738, thereby simulating actual use of the decoy domain services. Accordingly, an attacker seeking to identify services that are accessible through the AD server 714 will find references to the decoy domain services and the user accounts used to access them. The attacker may then use this information to attempt to infiltrate the decoy domain services.

The method 800 may further include detecting 818 authentication using the credentials planted 814 on the AD server 714 and engaging and monitoring 820 the attacker system using the credentials. In particular, any user other than the BotSink 300 that accesses the decoy domain services must be an attacker system. In some embodiments, an alert may also be output solely in response to use of the credentials by a user other than a simulated user of the BotSink 300. The alert may be in the form of an email, text message, or other type of message to one or more administrators of the AD server 714.

Any attempt to authenticate with the BotSink 300 using the planted 814 credentials may prompt actions to minimize harm by the attacker. At the same time, the actions of the attacker may be observed to gain understanding of attacker intent, methods and motivation. This diverts attention away from other possible attack targets in the corporation. For example, monitoring and engaging an attacker may include performing some or all of the functions described herein ascribed to the BotSink 300, BotMagnet 180, and Sinkhole 190. In particular, actions detected by any of these components may be reported to the MDCE 185, which may then perform some or all of the actions described above as being performed by the MDCE 185 in response to detecting unauthorized activity. As noted above, the BotSink 300 may implement some or all of the functions ascribed to the BotMagnet 180, Sinkhole 190, and MDCE 185. Accordingly, any of these components may perform the functions described with respect to FIG. 8 in the place of the BotSink 300.

Figure 9:
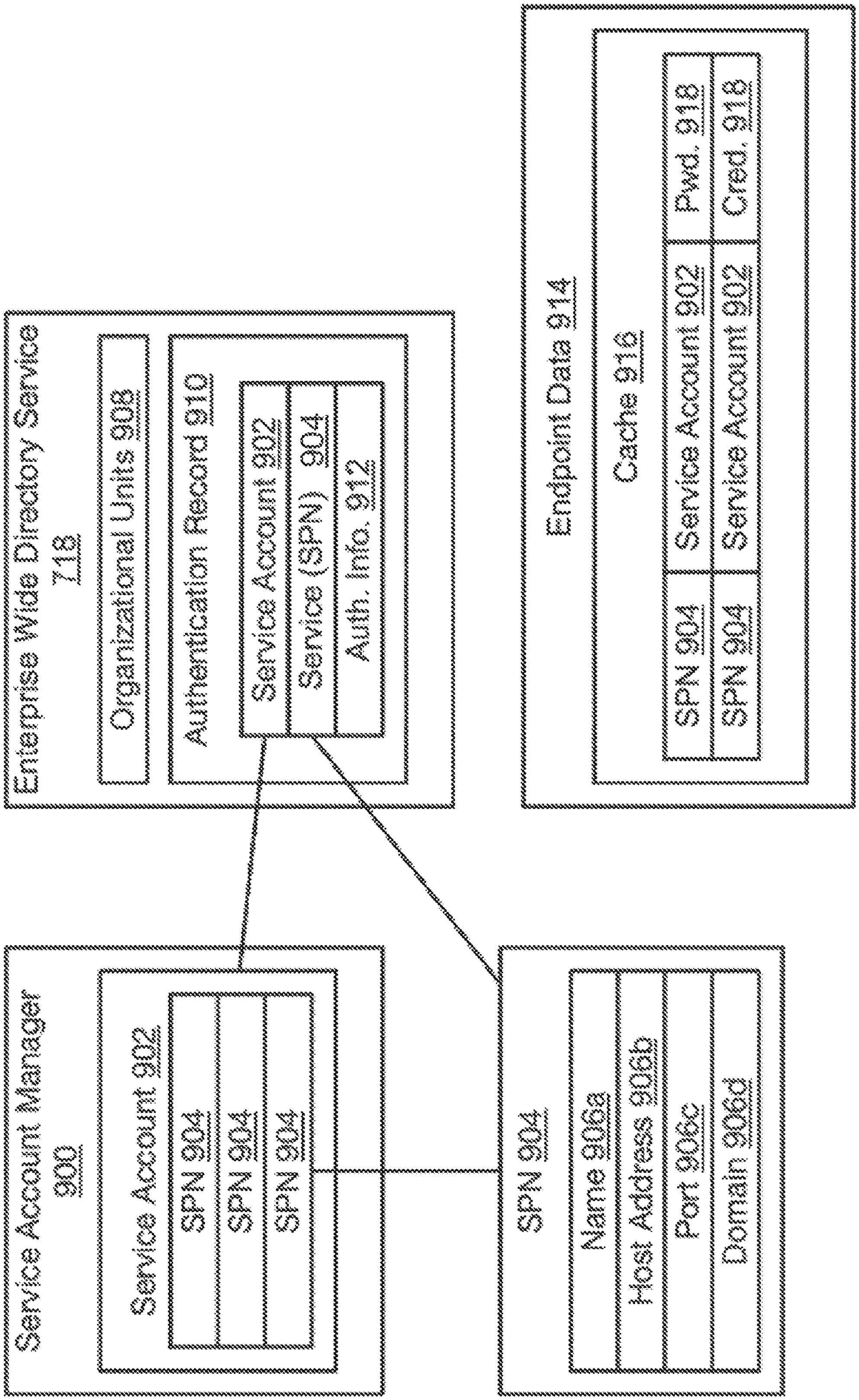
FIG. 9 is a schematic diagram of modules and data structures for implementing decoy services in accordance with an embodiment of the present invention.

Referring to FIG. 9, MICROSOFT provides various services and data structures that facilitate system administration in a network environment. In particular, Group Managed Service Accounts are implemented for services represented by Service Principle Names (SPNs). Examples of services that may be represented by an SPN include a database (SQL, MYSQL, MSSQL, ORACLE, etc.), web server (e.g., APACHE), HTTP (Hypter Text Transfer Protocol) Servers, FTP (File Transfer Protocol) Servers, SMB (server message block) Servers etc. in the network.

In the illustrated system, a service account manager 900 implements the Group Managed Service Accounts. Accordingly, the service account manager 900 may store or access data defining service accounts 902. The service account manager 900 may manage authentication of users associated with the accounts 902 and may therefore store or access data including usernames of accounts and passwords for the usernames. The service account manager 900 may also store or access certificates, credentials, encryption keys, or other data for performing authenticating for the user accounts with an endpoint computing device.

Each user account may have one or more SPNs 904 associated therewith. Each SPN 904 may be specified to the service account manager manually by an administrator or gathered from the enterprise wide directory service 718. For example, below are two examples of instructions to the service account manager 900 to create an SPN 904:

Instruction to create an SPN for an HTTP Web Service in the network: Setspn-S HTTP/FQDN_OF IIS_SERVER domain\username.

Instruction to create an SPN for an MSSQL Service running in the network: Setspn-A MSSQLSvc/SQL-SERVERT01: 1433 domain\sqlsrv As can be seen in this example, an SPN 904 may include a name 906*a* of a particular instance of a service ("HTTP," "MSSQLSvc") as well as a name 906*b* or address of the server hosting the service ("FQDN_OF IIS_SERVER," "SQLSERVERT01"). In some instances, such as shown in the MSSQL example, the SPN 904 further includes a port number 906*c* for the service ("1443"). The SPN 904 may further specify a domain 906*d* to which the service belongs such as a specific user account in a domain ("domain\username") or simply a particular domain ("domain\sqlsrv"). A username or domain specified in the name 906*a* may be a username or domain managed by the enterprise wide directory service 718. For example, the domain for a username or specified without a username may be an Organizational Unit (OU) defined by the enterprise wide directory service 718.

The enterprise wide directory service 718 may include data structures defining one or more OUs 908. As known in the art an OU may be embodied as an ACTIVE DIRECTORY container, which hosts users, groups, computers and other OUs. OUs can contain other OU's and form a hierarchal model. Users can apply security polices at the OU level. Accordingly, the host for a service represented by an SPN 904 may be assigned to a particular OU 908 in the ACTIVE DIRECTORY. ACTIVE DIRECTORY supports an OU hierarchy that defines logical administrative units for users, groups, and resource objects, such as printers, computers, applications, and file shares. The OU hierarchy within a domain is independent of the structure of other domains; each domain can implement its own hierarchy. Customers can deploy unique separate services within each OU. As noted above, the content of the SPN 904 may be derived from the enterprise wide directory service 718, e.g. the ACTIVE DIRECTORY service.

As noted previously, the enterprise wide directory service 718 may also manage authentication of users attempting to access services for a particular OU 908. For example, authentication records 910 for services managed by the directory 718 may include references to a particular service account 902, an SPN 904 for a particular service managed by the directory 718, and one or more items 912 of authentication information, such as a password, authentication credential, certificate, token, or other structure used to evaluate a request for authentication. Accordingly, the service 718 may grant a request from a user associated with the service account 902 to access the service represented by the SPN 904 when accompanied the correct authentication information corresponding to the authentication information 912 in the record 910 for that service account 902 and SPN 904.

The methods disclosed herein may also operate with respect to endpoint data 914. The endpoint data 914 may be located on endpoint devices 704, 706 (see FIG. 7) that access a service. The endpoint data 914 may include a browser cache or other cache 916 of data used by the end point device 704, 706 to automate authentication with the directory service 718 or other service.

As shown in FIG. 9, the cache 916 may store entries that reference the SPN 904 of a particular service, a service account 902 (e.g., service account name or username authorized for accessing the service account 902) that was used or can use the particular service, and a password 918, credential 918, or other authentication data that may be used to authenticate a user associated with the service account 902 to access the particular service either directly or by way of authentication with the directory service 718.

Figure 10:
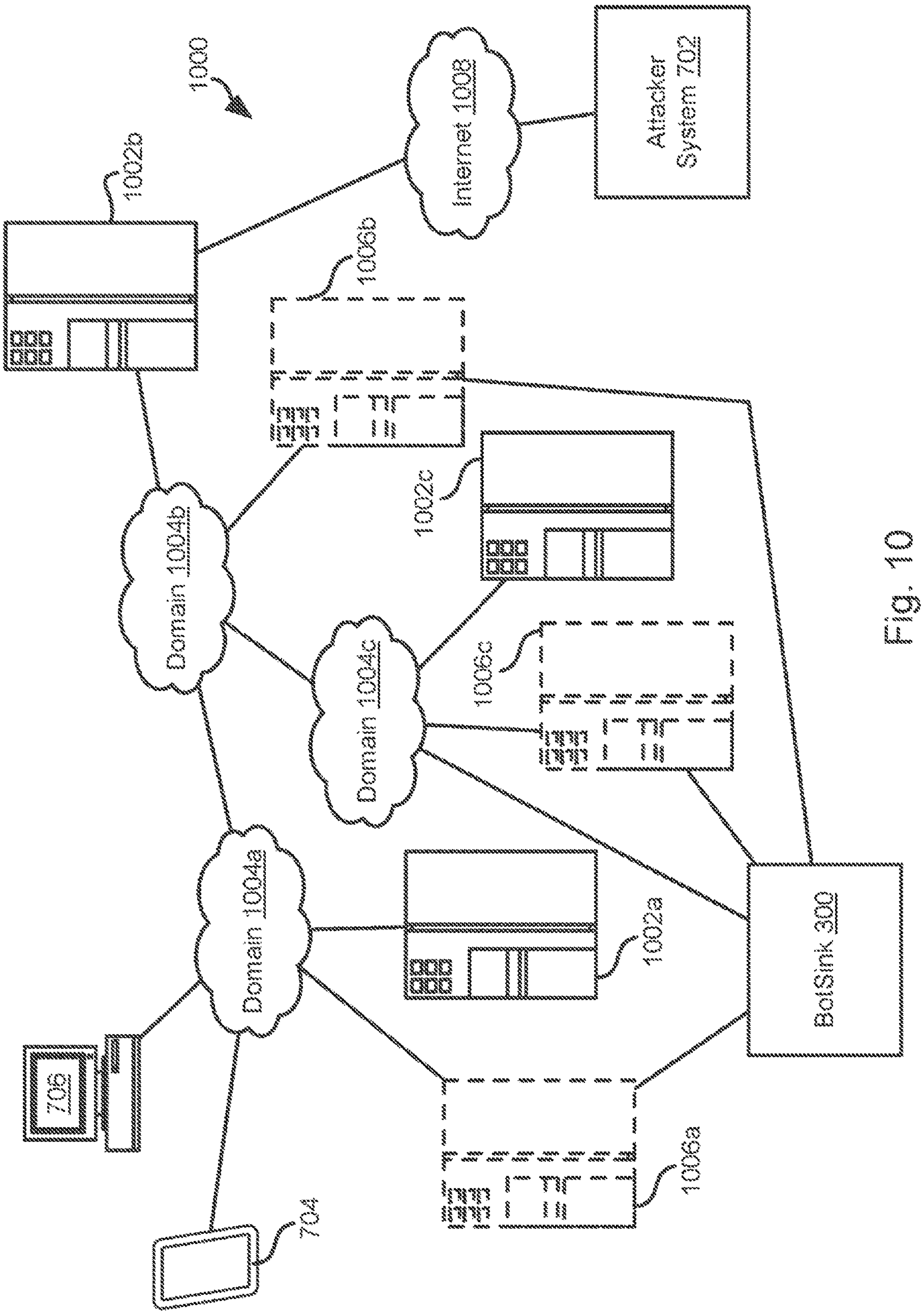
FIG. 10 is a schematic diagram of a network environment including decoy services in accordance with an embodiment of the present invention.

Referring to FIG. 10, a network environment 1000 may include a plurality of servers 1002*a*-1002*c* belonging to one or more domains 1004*a*-1004*c* (e.g., OUs). The network environment 1000 may include computing devices and components according to any of the embodiments disclosed herein above. The servers 1002*a*-1002*c* may implement services represented by SPNs 904. Likewise, these services may be represented in OUs managed by the directory service 718 and authentication for these services may be performed by way of the directory service 718 implemented in the network environment 1000 according to the methods described herein (see, e.g., the description of FIG. 7).

Endpoint devices 704, 706 may access these services, such as by authenticating with the directory service 718 using a username and password, credential, or other data structure. The directory service 718 may execute on any of the illustrated servers 1002*a*-1002*c* or a different server system. The directory service 718 may also authenticate with the services on the server system 1002*a*-1002*c* using credentials for the services. Users that authenticate with the directory service 718 and belong to the OU of a service may then be allowed by the directory service 718 to access the service using the credential for the service.

An attacker system 702 may attempt to access any of the server systems 1002*a*-1002*c* or endpoints 704, 706, such as by way of the Internet 1008. An attacker system 702 may be a remote computing device or a computing device executing in the network environment and executing malicious code.

The BotSink 300 may simulate servers 1006*a*-1006*c* providing services in some or all of the domains 1004*a*-1004*c*. In some instances, the same service may be made available by the BotSink 300 in multiple domains 1004*a*-1004*c* and may have different names in the multiple domains 1004*a*-1004*c*. Each service may execute within a virtual machine executing on the BotSink 300. In some embodiments, multiple BotSinks 300 may be used that each implement one or more services in one or more domains 1004*a*-1004*c*.

Figure 11:
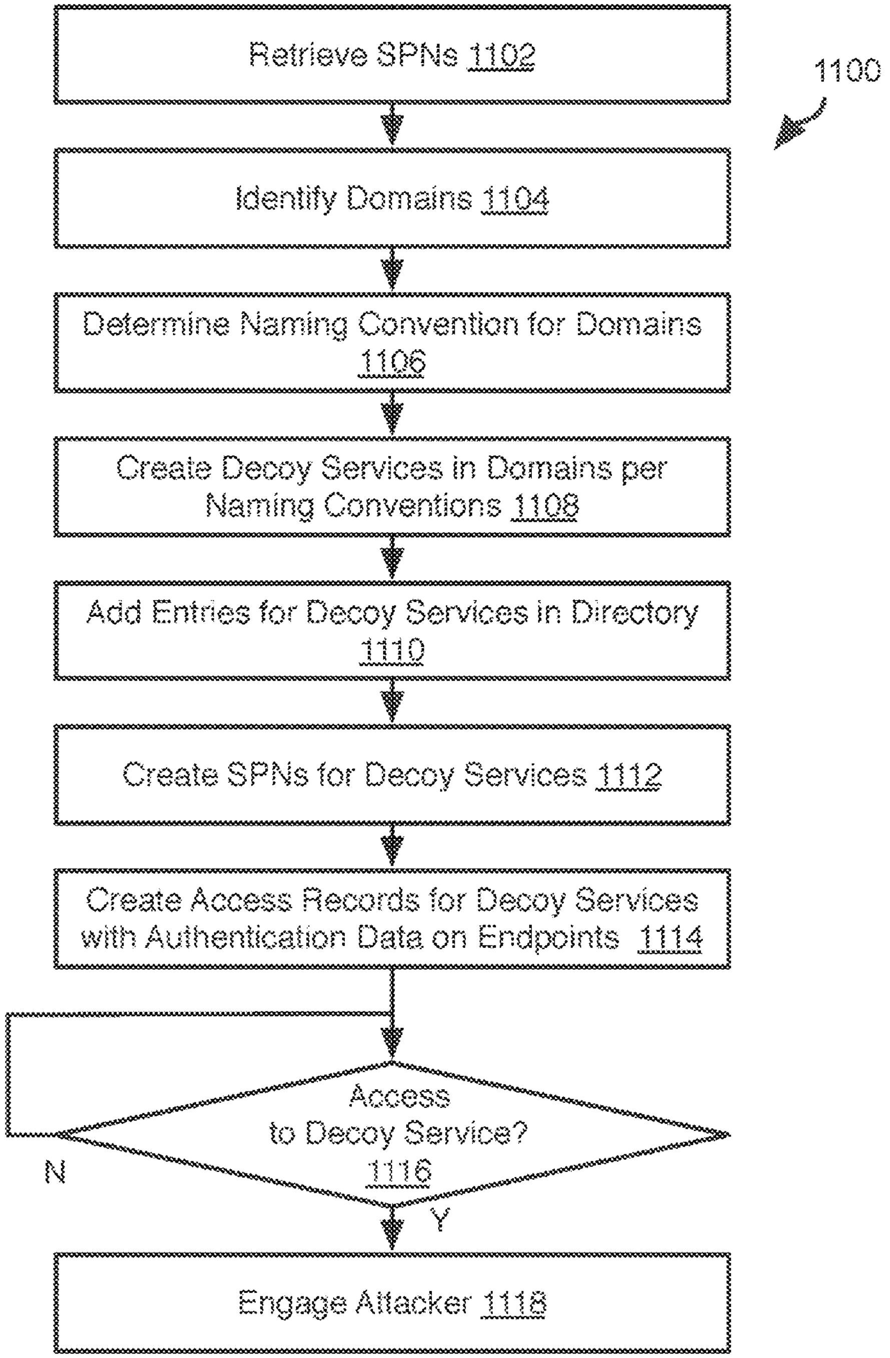
FIG. 11 is a process flow diagram of a method for implementing decoy services in accordance with an embodiment of the present invention.

Referring to FIG. 11, the illustrated method 1100 may be executed in the network environment 1000. The method 1100 is executed by the BotSink 300 unless otherwise indicated in the description below. The method 1100 may be executed periodically. For example, the method 1100 may be executed initially and then execute periodically with respect to the addition of new services and OUs 908 or other changes to the network environment 1000. The method 1100 may also be manually invoked by an administrator.

The method 1100 may include retrieving 1102 SPNs for the network environment 1000. The service account manager 900 may maintain a database of SPNs 904. Accordingly, step 1102 may include accessing this database and obtaining a listing of SPNs 904 in the network environment 1000.

The method 1100 may further include evaluating the SPNs 904 to identify 1104 domains (e.g., OUs) represented in the SPNs 904. The domain for a server may be identified using a reverse domain name lookup according to DNS. Step 1104 may further include identifying service accounts 902 associated with the SPN 904.

The method 1100 may further include determining 1106 naming conventions for the servers and instances of services in the identified domains. For example, these names may be NETBIOS names or DNS names for the servers 1002_a_-1002_c_.

As noted above with respect to FIG. 9, an instruction to create a SPN may include a name of the service, a name of the server hosting the service, and a domain of the service. Accordingly, for a given domain represented in the SPNs, all of the SPNs for a given domain may be grouped together and analyzed to determine 1106 naming conventions for the servers in that domain. In general, services may be named according to the executable code of which it is an instance, however, the process for determining naming conventions described below may be used to determine names for services as well.

A non-exhaustive list of example patterns may include:

A numerical pattern: [basename][number], where [number] changes with each server in the domain and [basename] is constant text or numerical string. Any number of number fields and text fields may be included in such a pattern, e.g. "datecenter02server01."

A taxonomy pattern, wherein each server name is a descendent node of a base node in a taxonomy of concepts. For example, all the servers in a domain may be named after rivers (Seine, Thames, Mississippi, Amazon, etc.), types of big cats (Lion, Tiger, Leopard, etc.).

A geographical pattern, wherein each server name corresponds to a geographic region in which it is located (e.g. "sanjose_server2").

Any combination of the above patterns or any other detectable pattern, e.g., one or more text components that include one or more of a geographical term or a node from a taxonomy in combination with one or more numerical labels.

Identifying 1106 the naming conventions may include comparing server names in a domain to a taxonomy, map data with geographic names, and identifying variation in numerical components of the server names.

For example, where all of the names of servers in a domain include a word that is a descendent of the same node in a taxonomy of concepts, a field may be added to a naming convention corresponding to that node, e.g. [bigCats], [majorRivers], or the like.

Where numbers at a common location in a server name (e.g., leading, trailing, or middle) show a pattern (a series of sequential numbers, a specific number of digits, or are simply present in each name regardless of numerical pattern), then a field may be added to a naming convention corresponding to that pattern, e.g., [sequentialNumber][basename], [evenNumber][baseName], [multipleOITen][basename], [sequentialNumber][basename][randomNumberofNDigits], or the like.

The fields identified may be arranged in the order present in the server names, e.g. [geographicName][taxonomyNodeName][sequentialNumber].

Where no pattern is present in the server names, then the naming convention may simply indicate the type of data for the server name. Where each server name is a number with no apparent pattern, the naming convention may simply be [N digit number], where N is the number of digits in the server names of a domain. Where each server name is simply apparently random nouns, then the naming convention may simply be [nouns] or [proper names], where the server names correspond to conventional names of persons in a particular language The method 1100 may further include creating 1108 decoy services in the domains identified at step 1104. For example, this may include instantiating an instance of an executable corresponding to a decoy service on the BotSink 300, such as in a virtual machine executing on the BotSink. Step 1108 may further include assigning an identity (e.g., DNS name, NetBIOS name) to the virtual machine that corresponds to the naming convention of a domain to which the service is to be added. For example, a name may be generated that includes values for each field concatenated together. For example, for a naming convention of the form [san_jose][famousPainter][sequentialNumber], a server name might be san_jose_picasso_11. The fields may be chosen such that the name selected for the decoy service is unique. In the preceding example, this may include choosing 11 inasmuch as san_jose_picasso_0 through san_jose_picasso_10 already exist in the domain.

Assigning an identity to a decoy service may include acquiring an IP address in the domain according to the naming convention of which the decoy service is named. Alternatively or additionally, the decoy service may be added to an OU defining the domain in the directory service 718, which is described below.

In some instances, a virtual machine hosting a decoy service may be placed in multiple domains and have multiple identities assigned to it corresponding to the naming conventions of these multiple domains. Decoy services may be added to a domain that one or both of supplement and complement production services implemented in that domain. For example, where a domain includes only database servers as determined from analysis of the SPNs 904 for the domain, a decoy service may itself implement a decoy database server. Where a domain includes multiple diverse services, the decoy could implement multiple diverse services matching the learned services. For example, the services running in a domain may include HTTP, MSSQL, TERMSRV, or the like. Accordingly, the decoys may be instances of one of these services. The number of decoy services implemented in a particular domain may be related to the number of production services in that domain. For example, the number of decoy services created for a domain may be a random number between 2 and 10 times the number of production services in the domain.

Note that the services created at step 1108 are real services executing on the BotSink 300 but not related to production services implemented by other server systems 1002_a_-1002_c_ in the network. In particular, the services created may be services implemented according to the approach described above with respect to FIGS. 7 and 8.

The method 1100 may further include adding 1110 entries to the directory service 718 corresponding to the decoy services created at step 1108. For example, an OU defining a domain may be modified to reference decoy services created for that domain, i.e., having identities corresponding to the naming convention of the decoy services. Step 1110 may further include adding an authentication record 910 for each decoy service. The authentication record may include an actual credential that is effective to grant access to the decoy service. In particular, the authentication record 910 may have some or all of the attributes of a BotSink credential 736 described above. Likewise, the manner in which a credential 736 is created at step 1110 may be performed in the same manner as for the credential 736 described above. Step 1110 may further include creating artificial entries in access logs 738 referencing the decoy services in the manner described above with respect to FIGS. 7 and 8.

The method 1100 may further include creating 1112 SPNs for the decoy services. As shown in FIG. 9, an SPN 904 may be associated with a service account 902 by the service account manager 900, the SPN 904 having a host name, host address, etc. corresponding to the other SPNs 904 of that service account. Accordingly, step 1112 may include creating SPNs and adding references to the SPNs 904 to service accounts 902. For example, where a decoy services is created for a particular domain (e.g., OU), a service account 902 belonging to that domain may be modified to refer to the SPN 904 for that decoy service. Accordingly, the service account 902 may refer to legitimate production services as well as decoy services.

In some implementations of a service account manager 900, a user that authenticates with the service account manager 900 for a service account 902 will then be authorized to access services corresponding to all SPNs 904 associated with that service account 902. The user may authenticate with the service account manager 900 directly or by authenticating with the directory service 718. Accordingly, by associating SPNs 904 for the decoy services with the service account 902, compromising of that service account by whichever means may result in a detectable attempt to access the decoy service.

In one example, adding a service to the SPN 904 may be performed providing the following instruction to the service account manager 900:

Setspn -A MSSQLSvc/SQLSERVERT12: 1433 domain\sqlsrv

The name SQLSERVERT12 may therefore be a name generated according to the naming convention of the domain "domain\sqlserv" according to the approach described herein. Likewise the instance name ("MSSQLSvc") and port ("1433") may be obtained from evaluating SPNs and determining conventions used.

The method 1100 may further include creating 1114 access record for the decoy services on the endpoints 704, 706. For example, this may include creating entries in a cache 916 that references the SPN 904 for the decoy services. In particular, where a device 704 is associated with a domain (e.g., OU), references to a decoy service created for that domain may be referenced in the cache 916. The entry in the cache 916 may include a reference to the service account 902 to which the SPN 904 for the decoy service was added.

The entry in the cache 916 may further include authentication data 918 in the form of a password or credential. The authentication data 918 may be represented in the entry as authentication data for the service account 902 in the entry in the cache 916. However, the actual password or credential to access the service account 902 by way of the service account manager 900 or directory service 718 may be different. Accordingly, a presenter of the actual authentication data (password, credential, token, etc.) for the service account 902 and requesting access to a non-decoy (production) service associated with the service account 902, will be authenticated and granted access to the non-decoy service.

The authentication data 918 in the entry for the decoy service in the cache 916 may either be simply simulated data that has no relevance or may be authentication data sufficient to authorize the presenter of the authentication data 918 with the BotSink 300 but not the actual service account 902 with which the service is associated by the service account manager 900. Stated differently, the BotSink 300 may one or both of (a) authorize any attempt to gain access to the decoy service represented by the entry in the cache 916 (such as after a random number of attempts have occurred) or (b) authorize access to the decoy service in response to receiving the authentication data 918 in the entry in the cache 916. The credentials 736 for the decoy services in the directory service 718 may also be configured to grant access in response to presentation of the authentication data 918. Note that an attacker that manages to authenticate for the service account 902 will obtain access to both production and decoy services. However, any attempt to access the decoy services will then result in detection according to the methods described herein.

The method 1100 may further include evaluating 1116 whether any attempts are made to access the decoy services. Inasmuch as the decoy services are not production services, only unauthorized users probing the directory service 718, endpoint cache 916, or service account manager 900 will attempt to access the decoy services. In practice, an attacker may see references to the decoy services on an endpoint 704, 706. The attacker may also attempt to access the directory service 718, which will include entries referencing the decoy service. The attacker will then have cause to determine that the decoy service is authentic and attempt to access the service.

In response to such access attempts, the BotSink 300 may engage 1118 the attacker system performing the attempts. Step 1118 may be performed in the same manner as for step 820 described above. In particular, an attacker may be permitted to authenticate with the service and access the service. Outbound traffic may be routed to a SinkHole 190. The monitoring and characterizing of an attacker system with respect to the decoy service may be performed according to any of the methods disclosed with respect to FIGS. 1-8.

Note that the decoy services according to embodiments disclosed herein may be real services accessible in the network environment 1000. Accordingly, one or more approaches may be used to distinguish the decoy services from production services implemented by the server systems 1002*a*-1002*c*.

For example, the BotSink 300 may be programmed not to respond to scanners attempting to identify available services where such scanners are executed by computers in the network environment, i.e., that are not an attacker system 702. In some implementations, an Access Control List (ACL) on the BotSink 300 may be used to implement this functionality. In other implementations, a whitelist includes a listing of legitimate services and is used by the endpoints 704, 706 to distinguish between production and decoy services.

Such approaches to distinguish between production and decoy services may be eliminated in most instances inasmuch as system administrators will have records and knowledge of production server systems 1002*a*-1002*c* and corresponding production services.

Figure 12:
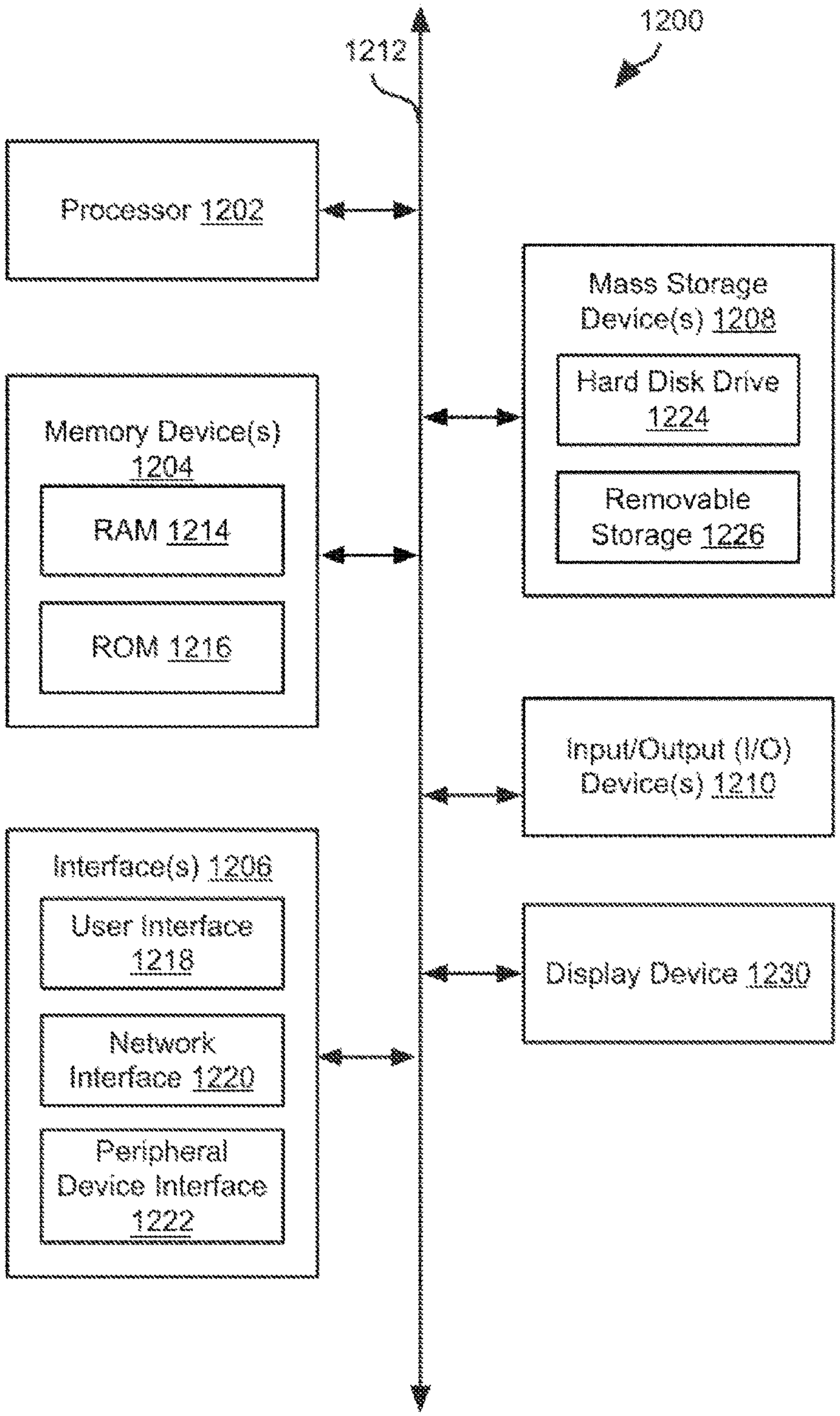
FIG. 12 is a schematic block diagram of a computer system suitable for implementing methods in accordance with embodiments of the present invention.

FIG. 12 is a block diagram illustrating an example computing device 1200 which can be used to implement the BotMagnet 180, the MDCE 185, 187, or 188, the Sinkhole 190, the Management Server or Monitor 195, and the BotSink 300. Some or all of the servers and computers of FIGS. 7 and 10 may also have some or all of the attributes of the computing device 1200. In some embodiments, a cluster of computing devices interconnected by a network may be used to implement any one or more components of the invention. For example, a cluster could be used for large-scale services such as a higher-level MDCE 187 or a "global" MDCE 188. This could also be true for the Sinkhole 190, which could be a cluster/service shared by all of the BotMagnets 180 in a local network.

Computing device 1200 may be used to perform various procedures, such as those discussed herein. Computing device 1200 can function as a server, a client, or any other computing entity. Computing device can perform various monitoring functions as discussed herein, and can execute one or more application programs, such as the application programs described herein. Computing device 1200 can be any of a wide variety of computing devices, such as a desktop computer, a notebook computer, a server computer, a handheld computer, tablet computer and the like.

Computing device 1200 includes one or more processor(s) 1202, one or more memory device(s) 1204, one or more interface(s) 1206, one or more mass storage device(s) 1208, one or more Input/Output (I/O) device(s) 1210, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more user interface elements 1218. The interface(s) 1206 may also include one or more peripheral interfaces such as interfaces for printers, pointing devices (mice, track pad, etc.), keyboards, and the like.

Bus 1212 allows processor(s) 1202, memory device(s) 1204, interface(s) 1206, mass storage device(s) 1208, and I/O device(s) 1210 to communicate with one another, as well as other devices or components coupled to bus 1212. Bus 1212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1200, and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed is:

1. A method comprising:

providing a network environment including a network and a plurality of servers in data communication with the network, each server of the plurality of servers implementing at least one service of a plurality of services;

implementing a mapping between a first service of the plurality of services and name data for the service, the name data including a name for a first server of the plurality of servers implementing the service, wherein the server is in communication with the network within the network environment;

analyzing the name data in the mapping to determine one or more naming conventions for the first server;

instantiating a decoy service, the decoy service being an instance of executable code;

associating, with the decoy service, a decoy name according to the one or more naming conventions;

providing an authentication directory, the authentication directory further including authentication records for accessing the first service; and modifying the authentication directory to include an authentication record referencing the decoy name in association with the decoy service associated with the decoy name and authentication data for accessing the decoy service associated with the decoy name;

wherein the authentication directory defines a domain such that the first server belongs to the domain; and wherein analyzing the name data for the first service in the mapping to determine the one or more naming conventions for the first server comprises determining a domain-specific naming convention of the one or more naming conventions for the domain.

2. The method of claim 1, further comprising processing the domain as a subject domain by:

determining the domain-specific naming convention for the first server belonging to the subject domain, the domain-specific naming convention being one of the one or more naming conventions;

generating a domain-specific name according to the domain-specific naming convention, the domain-specific name being the decoy name;

instantiating a domain-specific service having an address in the subject domain and corresponding to the first service implemented by the first server belonging to the subject domain; and associating the domain-specific name and the address in the subject domain with the domain-specific service in the mapping.

3. The method of claim 1, wherein the mapping comprises a plurality of Service Principal Name (SPN) entries of group managed service accounts.

4. The method of claim 1, further comprising:

providing an endpoint in the network environment and coupled to the network; and storing, on the endpoint, a decoy record referencing the decoy name and including authentication information for the decoy name.

5. The method of claim 4, wherein the authentication information includes at least one of a password and an authentication credential.

6. The method of claim 5, wherein:
the authentication information is first authentication information and refers to a service account;
at least one server hosts second authentication information associated with the service account and different from the first authentication information; and
the method further comprises:
authenticating a first request for the service account using the second authentication information on the at least one server; and
authenticating a second request for the service account using the first authentication information.

7. The method of claim 6, further comprising:
associating the name data for the first service with the service account in the mapping; and
associating the decoy name with the service account in the mapping.

8. The method of claim 4, further comprising:
receiving a request to access the first service, the request including the authentication information corresponding to the first service previously stored on the endpoint; and
in response to receiving the request, granting authorization to the first service and determining that unauthorized access of the network environment has occurred.

9. The method of claim 8, further comprising:
monitoring actions of a source of the request with respect to the first service.

10. The method of claim 9, further comprising:
generating a characterization of the source of the request according to the monitoring of the actions.

11. A system comprising:
a network environment including a network and a server in data communication with the network, the server implementing a service; and
a computer system programmed to:
implement a mapping between the service and name data for the service, the name data for the service including a name for the server implementing the service;
analyze the name data in the mapping to determine one or more naming conventions for the server;
instantiate a decoy service, the decoy service being an instance of executable code;
associate, with the decoy service, a decoy name according to the one or more naming conventions;
provide an authentication directory, the authentication directory further including authentication records for accessing the service; and
modify the authentication directory to include an authentication record referencing the decoy name in association with the decoy service associated with the decoy name and authentication data for accessing the decoy service associated with the decoy name;
wherein the authentication directory defines a domain such that the server belongs to the domain; and
wherein analyzing the name data for the service in the mapping to determine the one or more naming conventions for the server comprises determining a domain-specific naming convention of the one or more naming conventions for the domain.

12. The system of claim 11, wherein the authentication directory defines a plurality of domains such that the server belongs to at least one domain of the plurality of domains; and
wherein the computer system is further programmed to process each domain of the plurality of domains as a subject domain by:
determining a domain-specific naming convention for the server belonging to the subject domain, the domain-specific naming convention being one of the one or more naming conventions;
generating a domain-specific name according to the domain-specific naming convention, the domain-specific name being the decoy name;
instantiating a domain-specific service having an address in the subject domain and executing on the computer system; and
associating the domain-specific name and the address in the subject domain with the domain-specific service in the mapping.

13. The system of claim 11, further comprising:
an endpoint in the network environment and coupled to the network;
wherein the computer system is further programmed to:
store, on the endpoint, decoy records referencing the decoy name and including authentication information for the decoy name.

14. The system of claim 13, wherein the authentication information includes at least one of a password and an authentication credential.

15. The system of claim 14, wherein:
the authentication information is first authentication information and refers to a service account;
the server hosts second authentication information associated with the service account and different from the first authentication information; and
the computer system is further programmed to:
authenticate with respect to the service account using the first authentication information.

16. The system of claim 15, wherein the name data for the service is associated with the service account in the mapping; and
wherein the computer system is further programmed to associate the decoy name with the service account in the mapping.

17. The system of claim 16, wherein the computer system is further programmed to:
receive a request to access the decoy service, the request including authentication information corresponding to the service previously stored on the endpoint; and
in response to receiving the request:
grant authorization to the decoy service; and
determine that unauthorized access of the network environment has occurred.

18. The system of claim 17, wherein the computer system is further programmed to:
monitor actions of a source of the request with respect to the service.

19. The system of claim 18, wherein the computer system is further programmed to:
generate a characterization of the source of the request according to the monitoring of the actions.

* * * * *